United States Patent [19]

Inoue et al.

[11] Patent Number: 5,016,127
[45] Date of Patent: May 14, 1991

[54] MECHANISM FOR TRANSPORTING AND RECEIVING LARGE AND SMALL TAPE CASSETTES

[75] Inventors: Yasuo Inoue; Haruo Takeda; Keiji Sato; Noriyuki Yamazaki; Osamu Iida, all of Kanagawa, Japan

[73] Assignee: Sony Corporation, Tokyo, Japan

[21] Appl. No.: 326,097

[22] Filed: Mar. 20, 1989

[30] Foreign Application Priority Data

Mar. 23, 1988 [JP] Japan ................................ 63-69088
Mar. 31, 1988 [JP] Japan ................................ 63-79911
Apr. 6, 1988 [JP] Japan ................................ 63-84591

[51] Int. Cl.$^5$ .............................................. G11B 15/68
[52] U.S. Cl. ........................................ 360/94; 360/92; 360/99.02
[58] Field of Search .................................. 360/92-94, 360/96.5, 99.02

[56] References Cited

U.S. PATENT DOCUMENTS

| | | | |
|---|---|---|---|
| 4,506,323 | 3/1985 | Pusic et al. | 364/200 |
| 4,547,629 | 10/1985 | Corless | 365/229 |
| 4,707,618 | 11/1987 | Haas | 307/64 |
| 4,712,196 | 12/1987 | Uesugi | 365/229 |
| 4,754,348 | 6/1988 | Schwieker | 360/94 |
| 4,777,626 | 10/1988 | Matsushita et al. | 365/226 |
| 4,802,035 | 1/1989 | Ohtsuka | 360/92 |
| 4,807,066 | 2/1989 | Imazaike | 360/92 |

FOREIGN PATENT DOCUMENTS

| | | |
|---|---|---|
| 0166341 | 1/1986 | European Pat. Off. . |
| 56-103722 | 8/1981 | Japan . |
| 58-146099 | 8/1983 | Japan . |
| 62-008212 | 1/1987 | Japan . |

Primary Examiner—John H. Wolff
Attorney, Agent, or Firm—Lewis H. Eslinger

[57] ABSTRACT

An automatic cassette changer capable of selectively loading any of cassettes of various sizes upon a recording and/or playback unit, comprises cassette-housing racks capable of selectively storing any of large cassettes and small cassettes, and having first guides for the large cassette and second guides for the small cassette so as to put the respective cassettes in their proper positions; and a cassette transfer having third guides for the large cassette and fourth guides for the small cassette so as to have both sides of the respective cassettes guided, and capable of selectively moving any of the large cassette and the small cassette from the cassette-housing racks to the recording and/or playback unit, and vice versa.

9 Claims, 21 Drawing Sheets

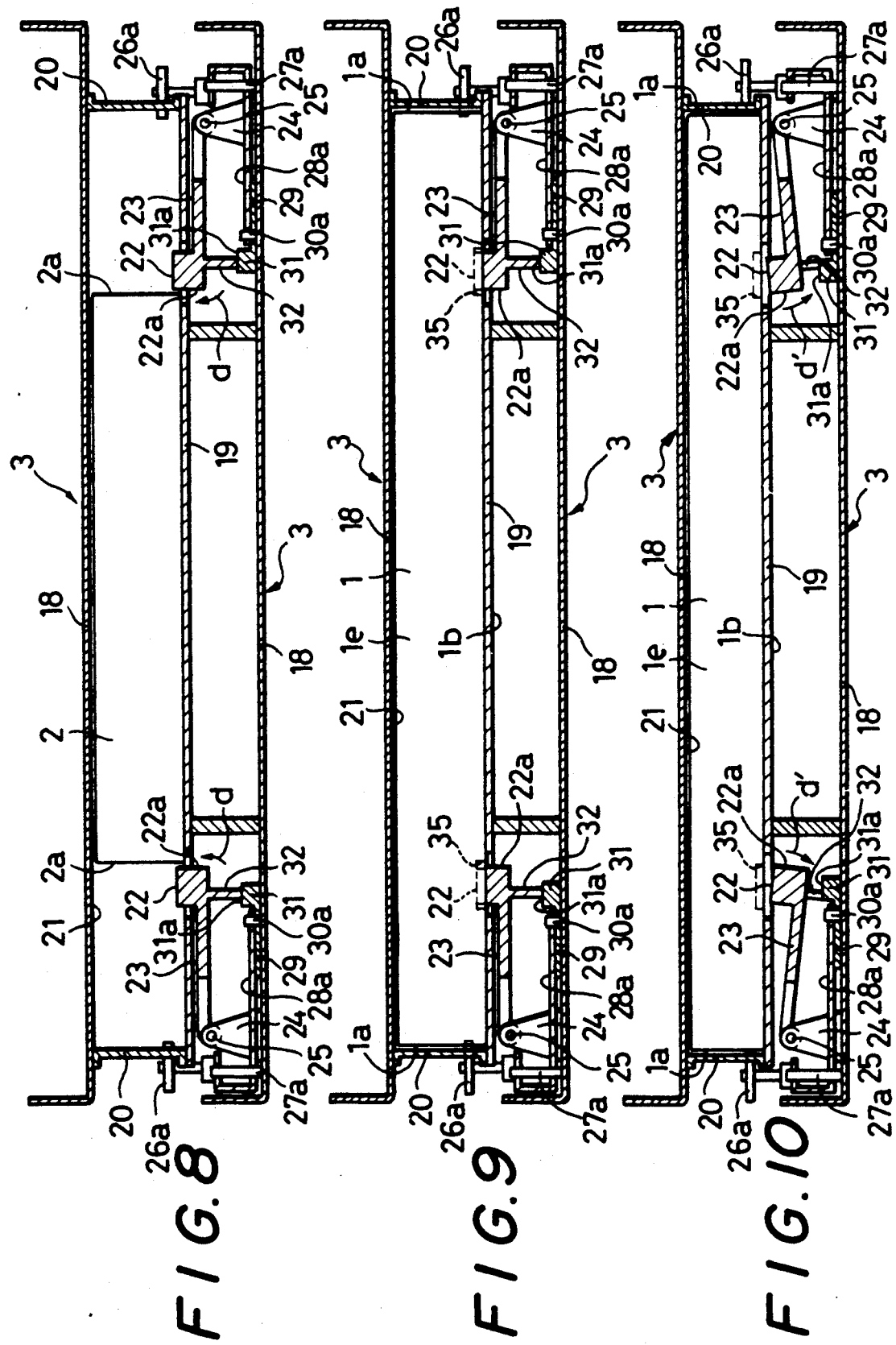

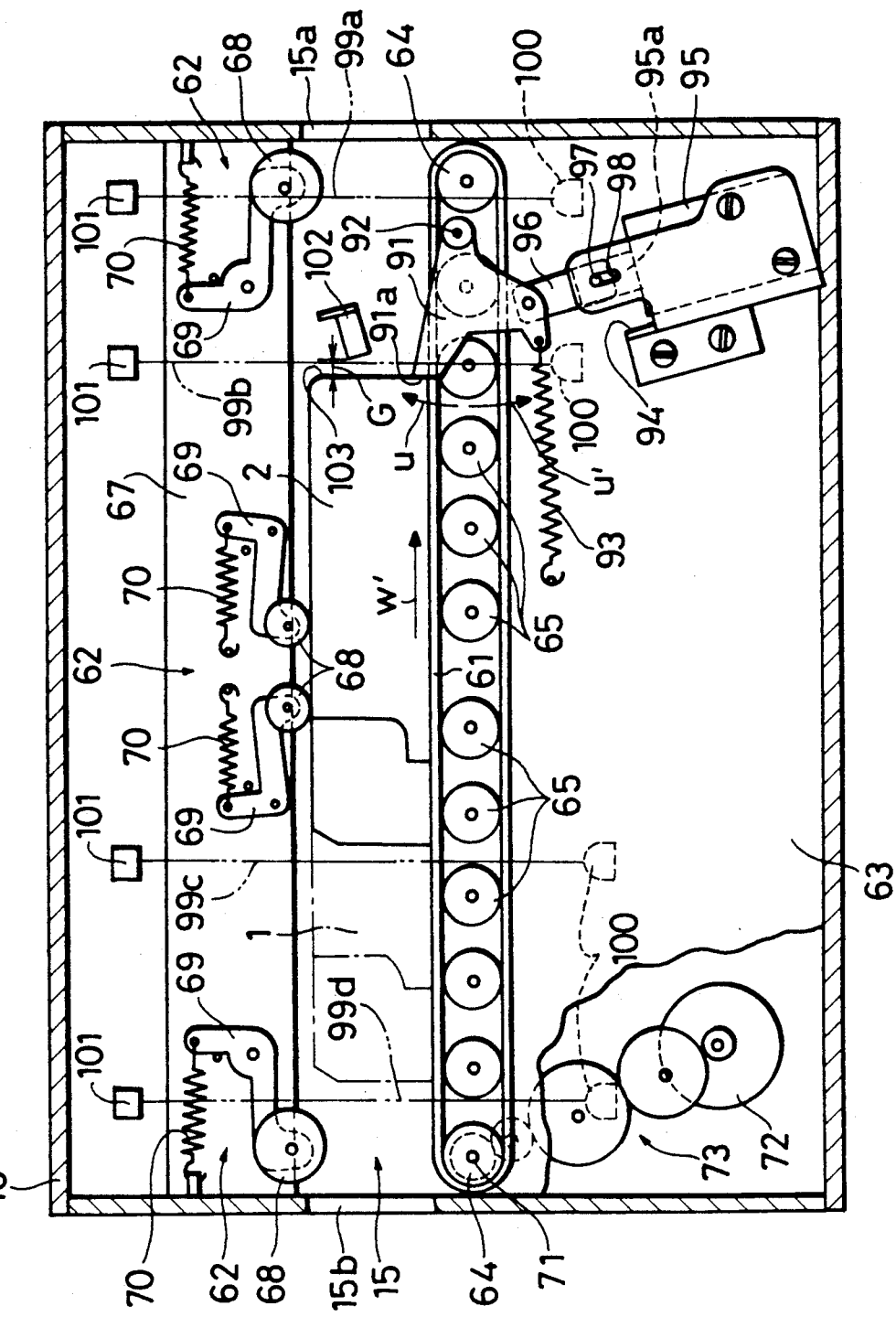

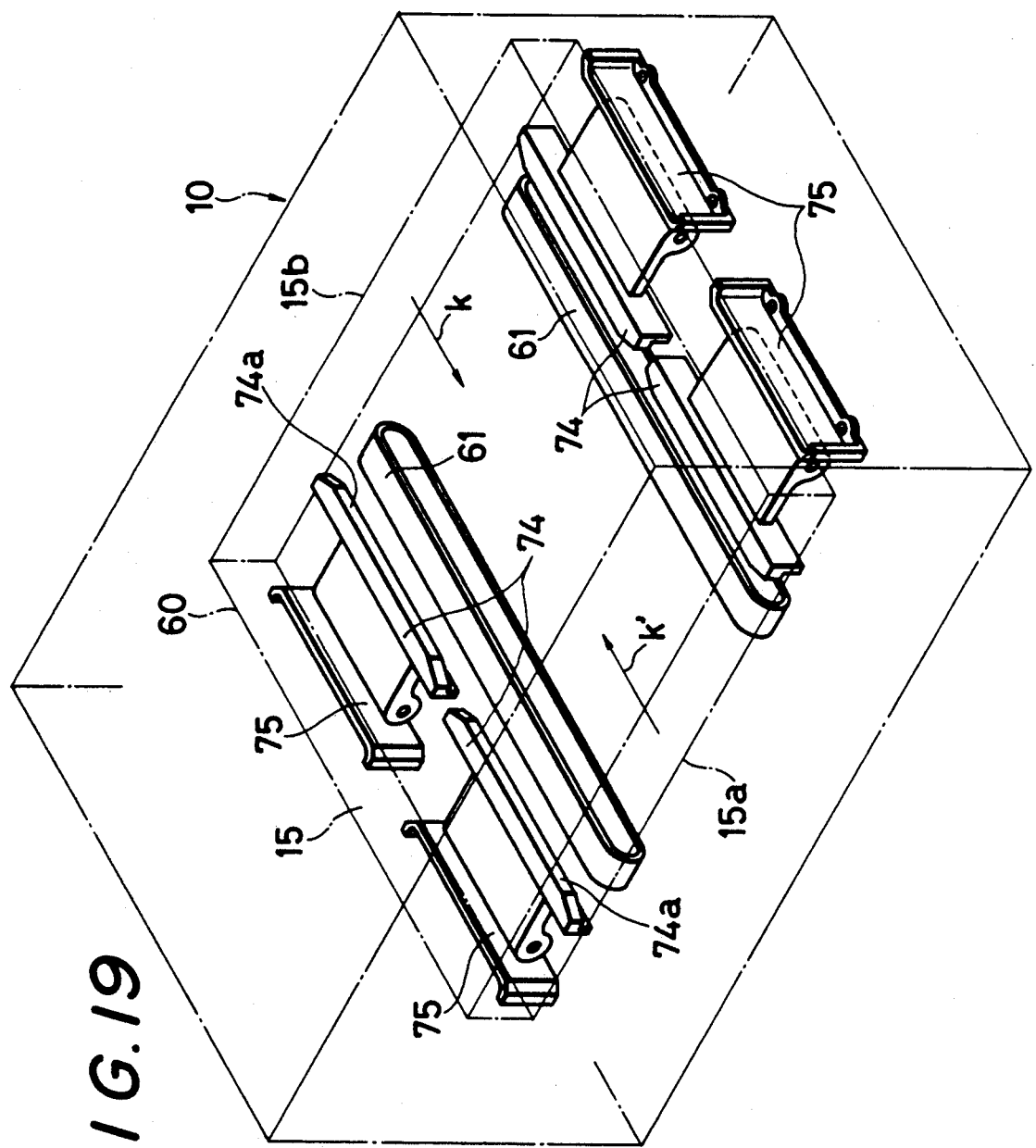

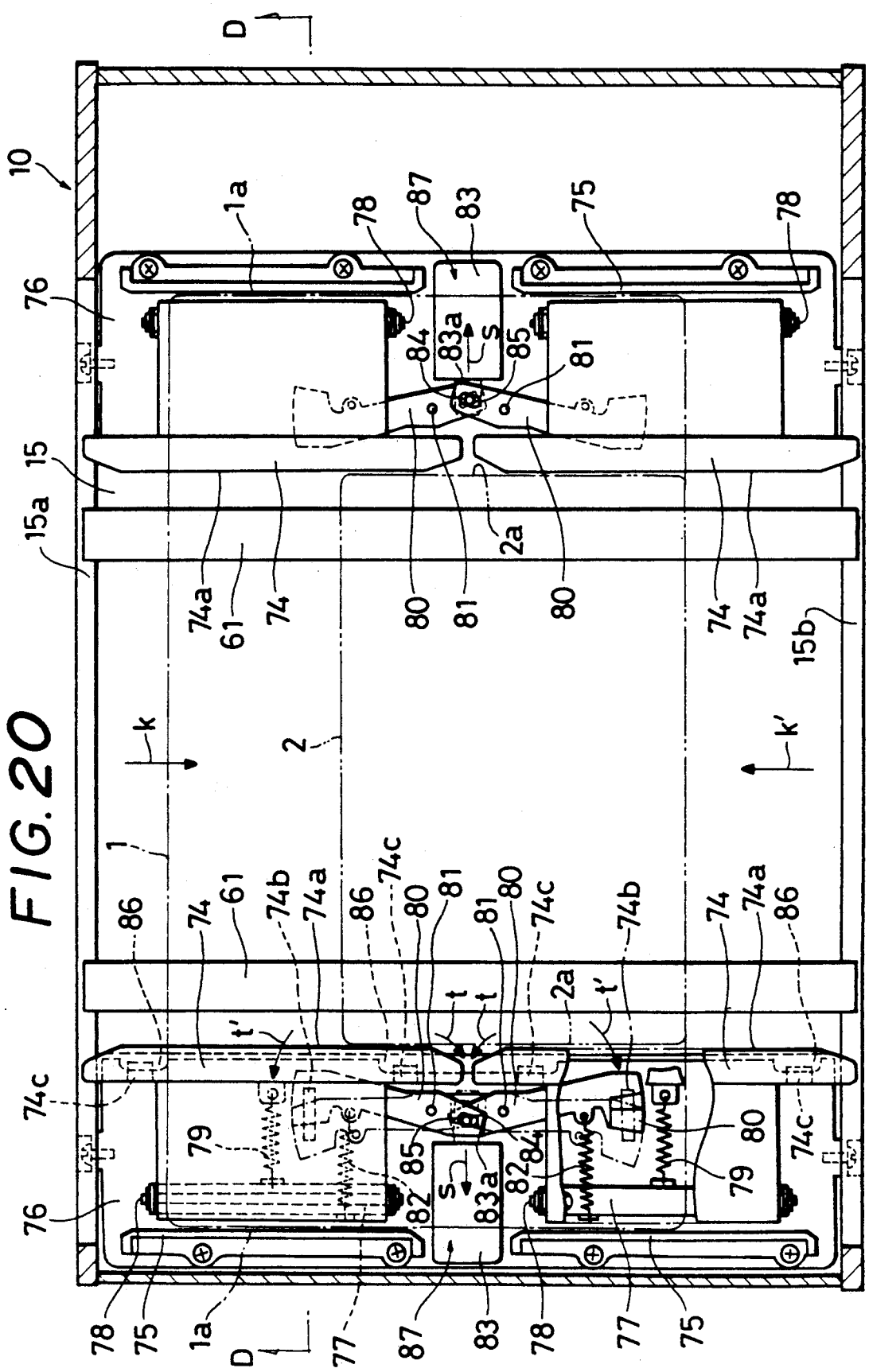

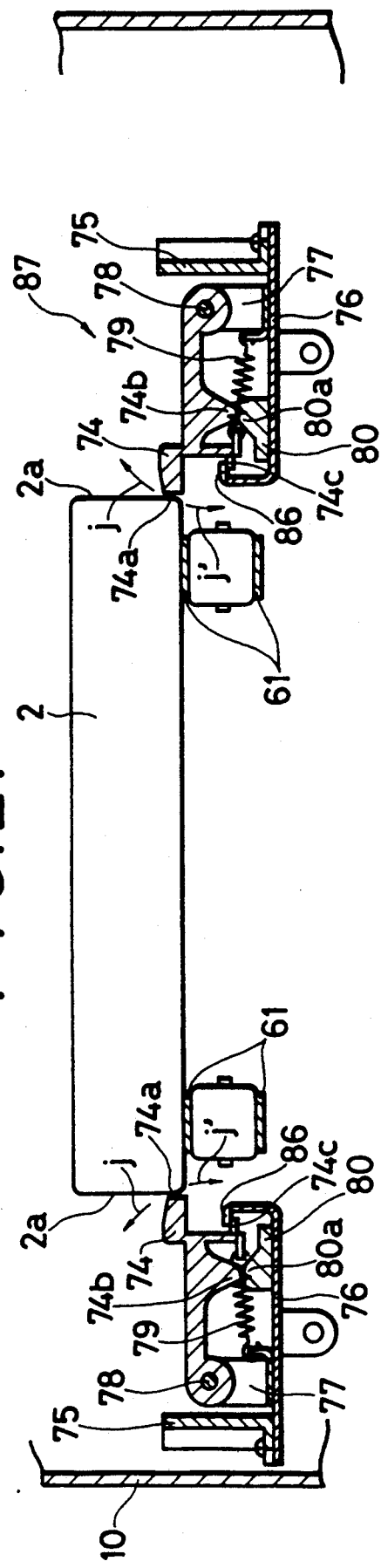
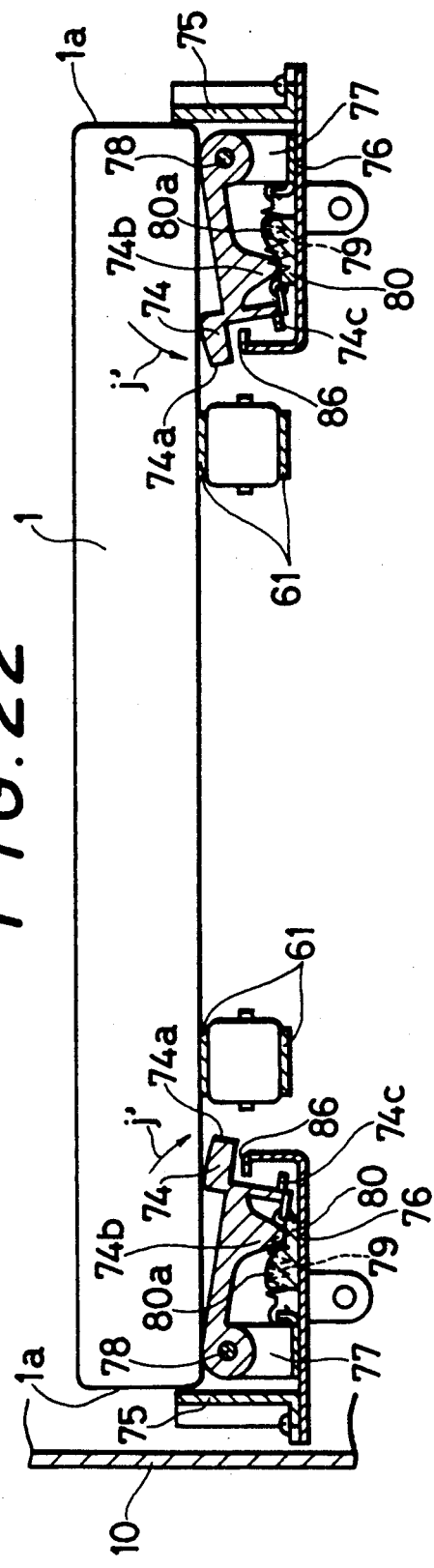

MECHANISM FOR TRANSPORTING AND RECEIVING LARGE AND SMALL TAPE CASSETTES

BACKGROUND OF THE INVENTION

1. Field of the Invention

This invention relates to an automatic cassette changer and specifically to such an automatic cassette changer as to be capable of selectively loading any of cassettes of two sizes, a large cassette and a small cassette in a recording and/or playback unit.

2. Description of the Prior Technology

For instance, disclosed in U.S. Pat. No. 4772968 is an automatic cassette changer, in which a plurality of cassettes held in a cassette-housing rack are selectively and automatically loaded into the playback unit by a cassette transfer unit and played back.

However, the cassette-housing rack and the cassette transfer unit disclosed in the above reference are designed to hold and transfer cassettes of the same size only. Therefore, in existing automatic cassette changers, it is impossible to selectively load any of cassettes of different sizes into a recording and/or playback unit.

OBJECTS AND SUMMARY OF THE INVENTION

The first object of this invention is to provide an automatic cassette changer that can selectively load cassettes of different sizes in a recording and/or playback unit.

The second object of this invention is to provide an automatic cassette changer which can correct the direction of the cassette taken into the cassette transfer unit from the cassette-housing rack or recording and/or playback unit.

In order to attain the first object of this invention, the automatic cassette changer according to this invention is provided with cassette-housing racks which have first guide members and second guide members to put large cassettes and small cassettes in their proper positions, respectively, and a cassette transfer unit which has third guide members and fourth guide members to guide both sides of the large cassettes and the small cassettes, respectively.

In order to attain the second object of this invention, when the cassette drawn from the cassette-housing racks or the recording and/or playback unit is going to be transferred into the cassette-housing unit provided in the cassette transfer unit by transfer belts, cassette installing stays projecting into the cassette-housing unit are provided for the cassette to be brought into contact with those cassette installing stays.

BRIEF DESCRIPTION OF THE DRAWINGS

FIG. 8 is a sectional view in the A—A direction in FIG. 4;

FIG. 9 is a sectional view in the B—B direction in FIG. 5;

FIG. 10 is a sectional view in the C—C direction in FIG. 6;

FIG. 18 is a side view of the cassette transfer unit shown in FIG. 17;

FIG. 19 is a schematic perspective view of the cassette transfer unit included in the automatic cassette changer according to this invention;

FIG. 20 is a plan view of cassette guides provided in the cassette transfer unit shown in FIG. 19;

FIG. 21 is a view of the cassette guides viewed in a direction D—D in FIG. 20, wherein a small cassette is in its proper position;

FIG. 22 is a view of the cassette guides viewed in a direction D—D in FIG. 20, wherein a large cassette is in its proper position;

DETAILED DESCRIPTION OF THE PREFERRED EMBODIMENTS

Figure 1:
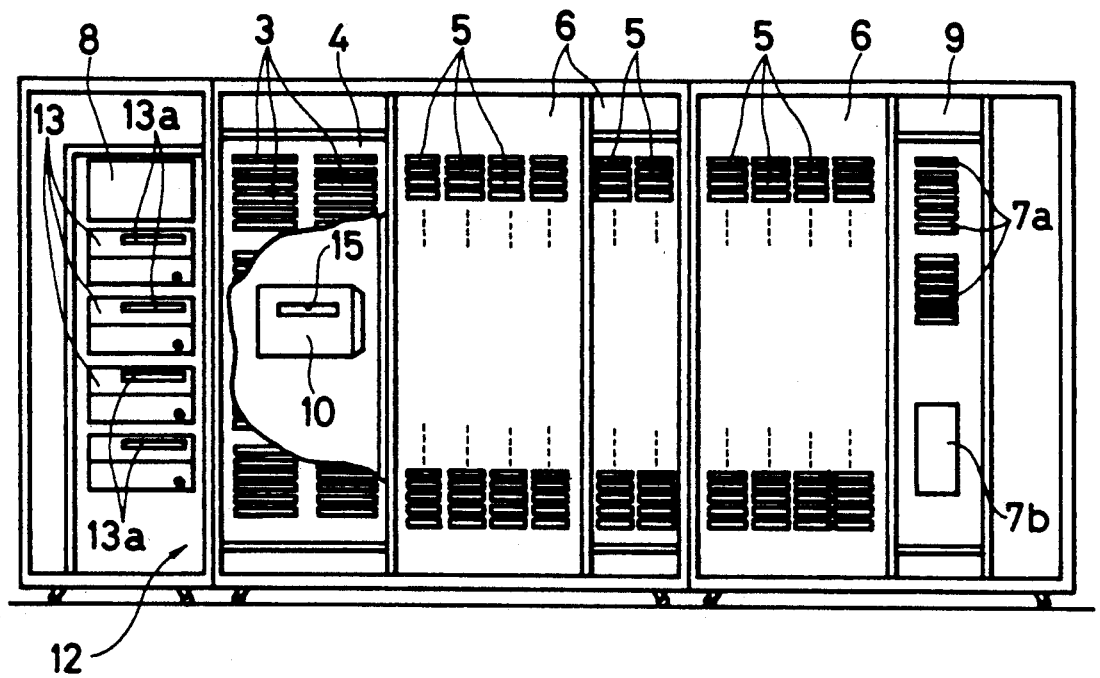
FIG. 1 is a front view of a automatic cassette changer according to this invention.

Referring to the drawings, an automatic cassette changer for video cassettes embodying the present invention is hereinafter described.

Figure 2:
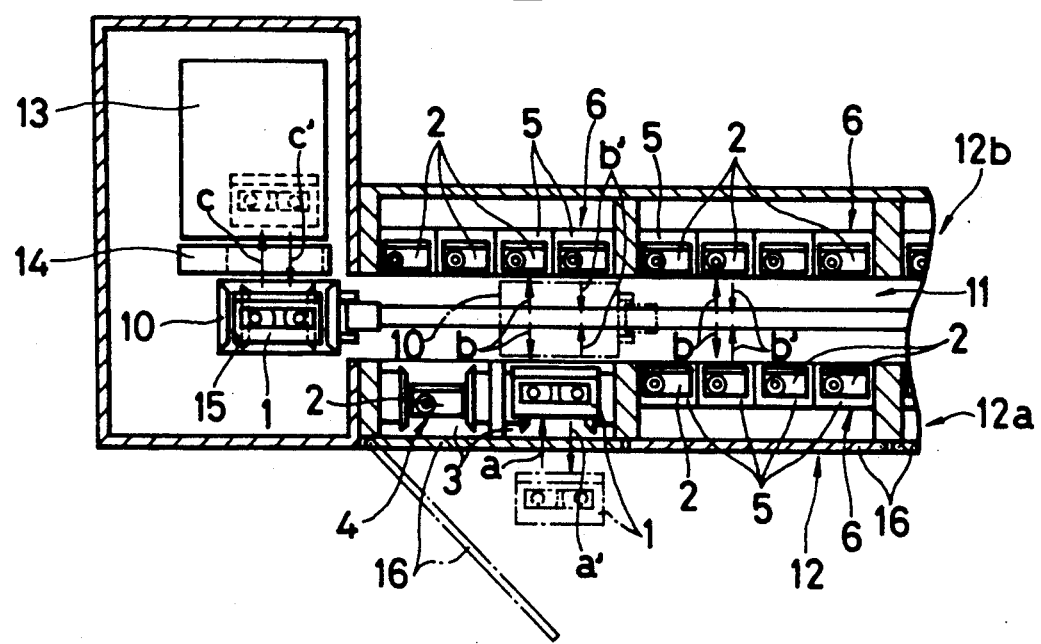
FIG. 2 is a plan view of a part of the automatic cassette changer according to an embodiment of this invention.

The automatic cassette changer shown in FIGS. 1 and 2 can handle any of cassettes of different sizes, large cassettes 1 and small cassette 2. The automatic cassette changer comprises a rack block 4 in which cassette-housing racks...- 3 selectively storing any of large cassettes 1 and small cassettes 2 are provided in several lines and in a few columns; three rack blocks 5, in each of which a plurality of racks are provided in several lines and in a few columns; a rack block 9 in which racks 7a for small cassettes insertion use and a rack 7b for small cassette ejection use; and others. These rack blocks 4, 6, and 9 are arranged in two rows on both sides of the transfer route 11 for the cassette transfer unit 10, which is movable vertically in FIG. 1 and laterally in FIG. 2. On one side not of the rack block row 12a corresponding to the operator side (the front side) 12, but of the rack block row 12b, recording/playback units 13 are vertically arranged in plural lines. Such a plurality of recording/playback units 13 are front-loading-type VTRs capable of selectively loading any of large cassettes and small cassettes used for recording or playback. The cassette inlets 13a of these recording/playback units 13 face to the operator side 12, and in front of the inlets, there are provided a plurality of cassette inserting/ejecting adaptors 14. The cassette transfer unit 10 has a cassette-housing unit 15 capable of selectively holding any of the large cassettes 1 and small cassettes 2. A control unit 8 is located above the uppermost recording/playback unit 13. This control unit 8 controls the cassette transfer unit 10 and recording/playback unit 13 according to information given by a predetermined operating program which consists of a playback or recording sequence of image signals, and so on. The cassette transfer unit 10 is movable between a desired position in the rack blocks 4, 6, and 9, and the recording/playback unit 13 according to the control signal supplied by the control unit 8, so as to selectively load any of cassettes stored in the rack blocks 4, 6, and 9 to the recording/playback unit 13 and vice versa. There are doors 16 in front of the rack block row 12a on the operator side 12. Before the automatic cassette changer is used, the large cassettes 1 and the small cassettes 2 are housed in the cassette-housing racks 3 and 5 beforehand. At that time, the operator inserts or ejects the large cassettes 1 and the small cassettes 2 to the cassette-housing rack 3 in a direction of arrows a and a' from the operator side 12, but in the cassette-housing rack 5 used only for the small cassettes 2, the cassettes 2 inserted in turns into the insertion rack 7a by the operator are transferred in turns by the cassette unit 10, and inserted into the cassette housing rack 5 in the direction of arrow b from the transfer route 11 side, and on the contrary, the cassettes 2 drawn from the cassette-housing rack 5 onto the cassette transfer unit 10 in the direction of arrow b are ejected from the ejection rack 2b on the operator's side 12.

Next, the cassette transfer unit 10 is controlled to transfer vertically and laterally along the moving route 11, so as to selectively receive the large cassette 1 or the small cassette 2 located at the designated rack address in the direction of arrow b', and hold it in the cassette-housing unit 15. Then, after transferring the cassette 1 or 2 housed in the cassette transfer unit 10 to a specified recording/playback unit 13, it loads the large cassette 1 or small cassette 2 into the designated recording/playback unit 13 from the inlet 13a using the adaptor 14 in the arrow c direction to record or playback the large cassette 1 or small cassette 2. However, the large cassette 1 or small cassette 2 after completion of recording or playback by the recording/playback unit 13 is unloaded in the arrow c' direction using the adaptor 14 and received by the cassette transfer unit 10 and returned to the original address in the reverse to the above sequence.

By repeating the above operation continuously, long-time continuous video playback, image recording, etc. are possible. In addition, such a method to distinguish the length of the recording/playback time by the sizes of the large and small cassettes 1 and 2 can be used so that short-term commercials or other programs can be televised using the small cassette 2, while televising news or various long-term programs can use the large cassette 1.

Figure 3:
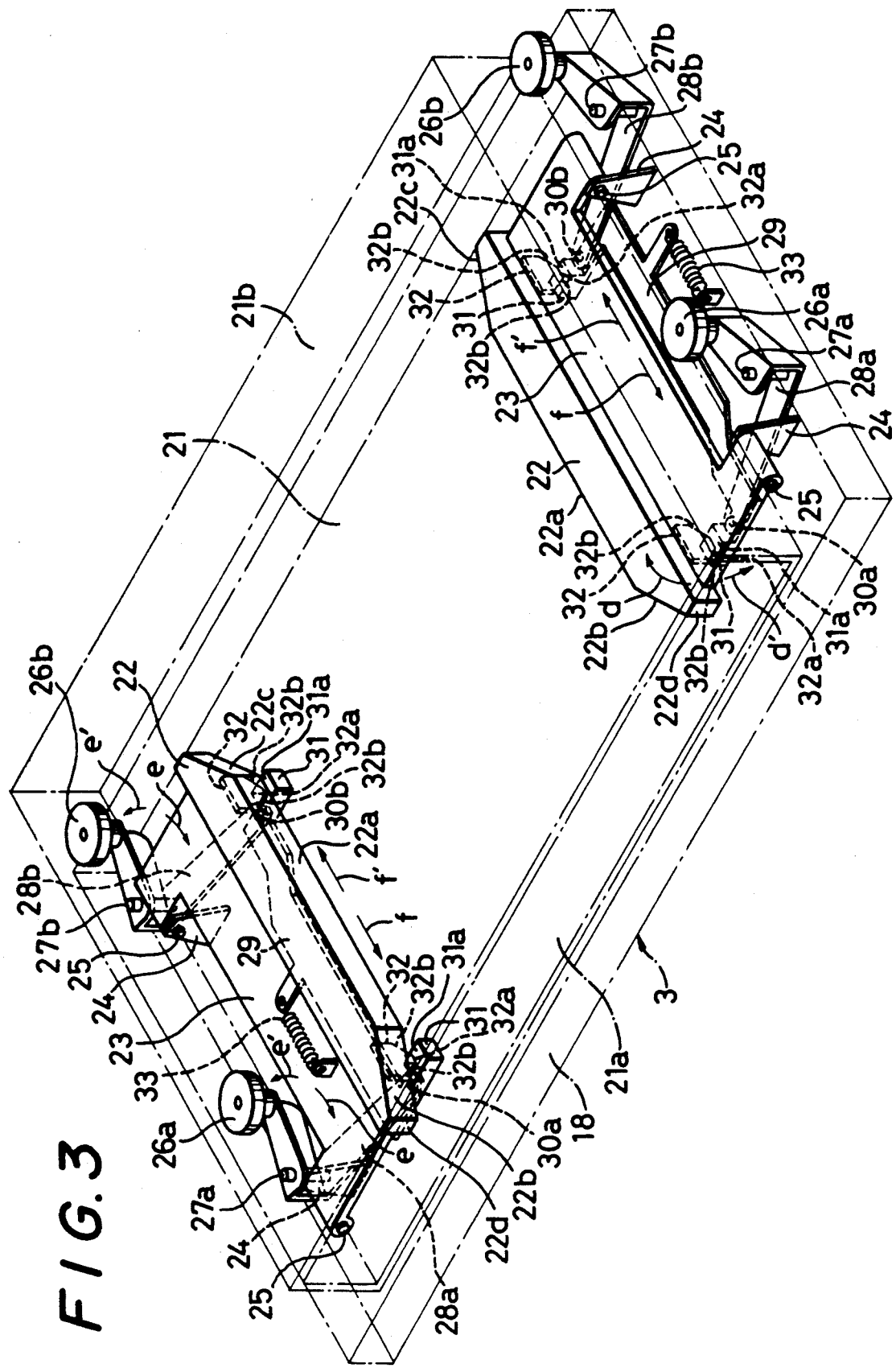
FIG. 3 is a perspective view of the housing rack in the automatic cassette changer, storing any of large cassettes and small cassettes.
Figure 4:
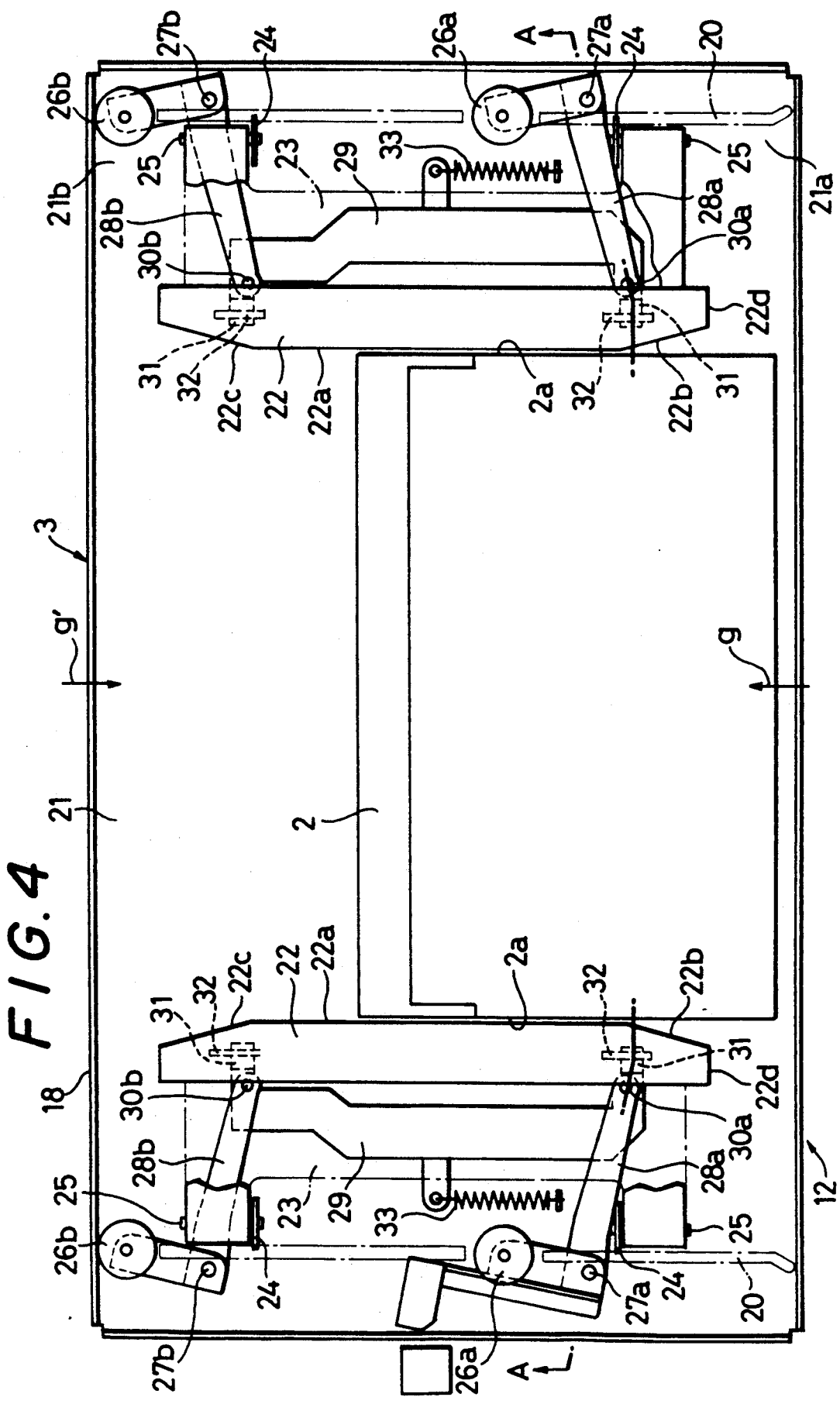
FIG. 4 is a plan view of the housing rack shown in FIG. 3, wherein a small cassette is accommodated.

Next, referring to FIGS. 3 to 14, the rack 3 holding both large and small cassettes is described in detail. As shown in FIGS. 3, 4, and 8, the rack plate 19 is installed horizontally above the rack chassis 18 made of a metal plate, and a pair of right and left large-cassette guide plates 20 are vertically installed on both right and left sides of the rack plate 19. A rack chassis 18 right above the above-mentioned rack chassis is installed nearly above both the large-cassette guide plates 20, and a cassette-housing unit (space) 21 is formed by these rack plates 19, both the large cassette guide plates 20, and the above rack chassis 18. Front and rear ends of the cassette-housing unit 21 form the openings 21a and 21b, respectively.

At the bottom of the cassette-housing unit 21, a pair of small-cassette guides 22 are installed in parallel and with symmetry on the right and left sides. Both small-cassette guides 22 are rail-like, having guide surfaces 22a in parallel with each other and slanted surfaces 22b and 22c formed at both their ends in the longitudinal direction. These small cassette guides 22 are formed of synthetic resin integrally on the inside of the pair of right and left oscillating plates 23. The outer ends of both oscillating plates 23 are installed on the bracket 24 fitted on the rack chassis 18 by the horizontal fulcrum shaft 25 so as to freely oscillate in the vertical direction (arrow mark d and d' direction).

On the right and left sides of the cassette-housing unit, a pair of detection rollers 26a and 26b (4 in total), for detecting large cassettes, are provided respectively. These detection rollers 26a and 26b are installed to rotate freely to one end of the part of L-shaped rotary arms 28a and 28b, which are installed to rotate freely to the upper part of the right and left sides of the rack chassis 18 through the vertical fulcrum shaft 27a and 27b in the arrow e and e' directions respectively on the front and rear, 4 in total. The front and rear ends of the pair of right and left cam levers 29 are interconnected between the above-described pairs of front and rear rotary arms 28a and 28b by the pins 30a and 30b so as to rotate freely. The front and rear pairs of rotary arms 28a and 28b and the right and left pair of cam levers 29 form parallel four link mechanisms which oscillate around the fulcrum axes 27a and 27b.

A pair of cam drive units 31 are provided integrally above the front and rear ends of the right and left pair of cam levers 29 and a pair of cam followers 32 are provided integrally on the lower surfaces at the front and rear ends of the pair of right and left oscillating plates 23. The cam drive units 31 form a square, the upper end surface 31a is formed level, the cam followers 32 approximately form a crest, and the front and rear sides of the level lower end surface 32a form tapered surface 32b. The pair of right and left cam levers 29 are, forced in the f direction by the pair of right and left return springs 33 installed between the rack chassis 18 and the cam lever 29. Thereby the cam follower 32 is pushed upward by the cam driving unit 31, the pair of right and left oscillating plates 23 are pushed up in the arrow d direction, and the pair of right and left small cassette guides 22 are forced from below towards the inside of the cassette-housing unit 21 as shown in FIG. 8. The four rotary arms 28a and 28b are forcibly rotated in the direction by the pair of right and left return springs 33 and the four detection rollers 2a and 26b are forced from right and left sides towards the inside of the cassette-housing unit 21.

The operation to insert selectively the large and small cassette 1 or 2 into the cassette-housing unit 21 is described below.

FIGS. 4 and 8 show the small cassette 2 is inserted into the cassette-housing unit 21 through the opening 21a on the above-described operator side 12 in the arrow g direction.

Figure 5:
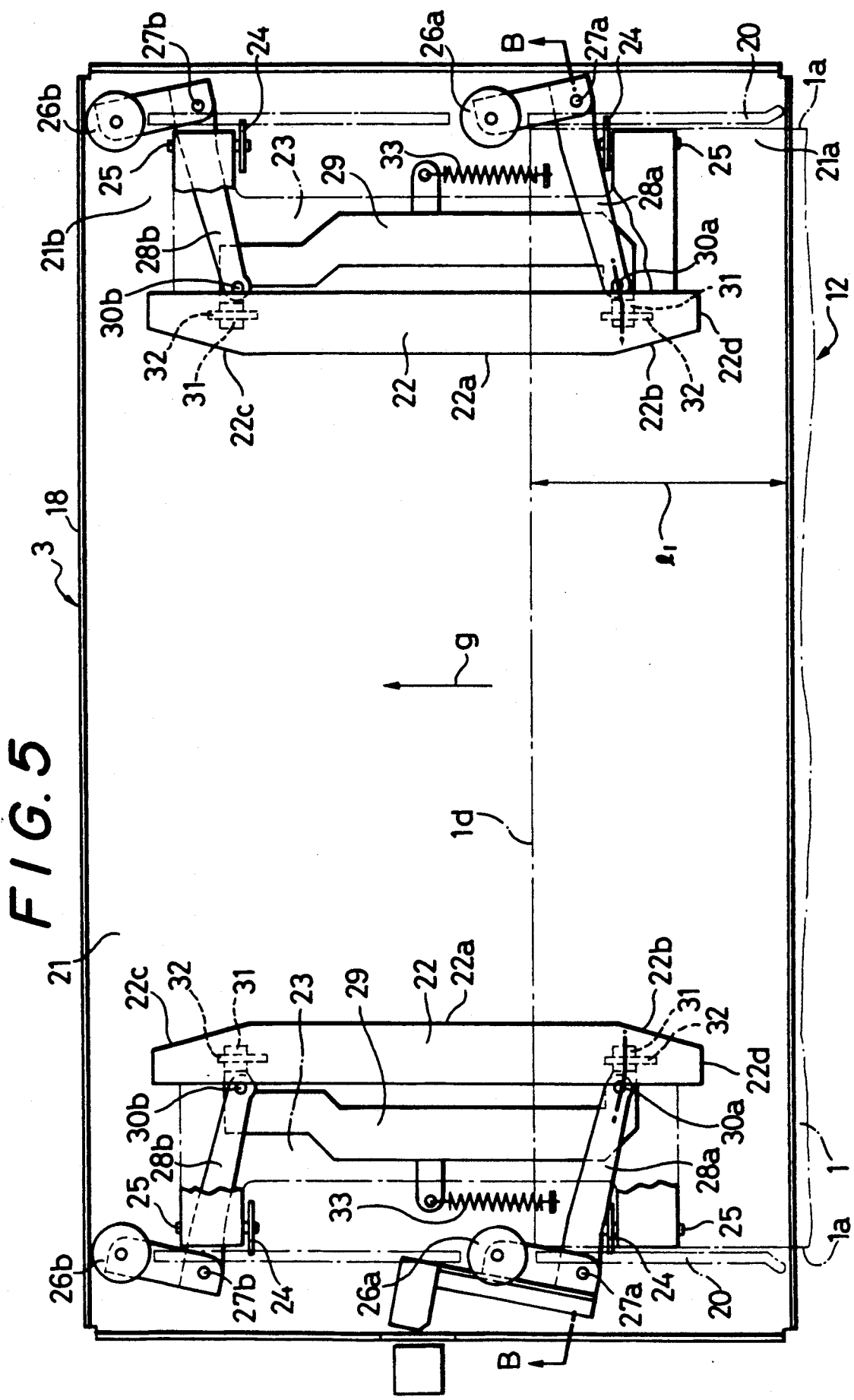
FIG. 5 is a plan view of the housing rack shown in FIG. 3, wherein a large cassette is going to be inserted.
Figure 6:
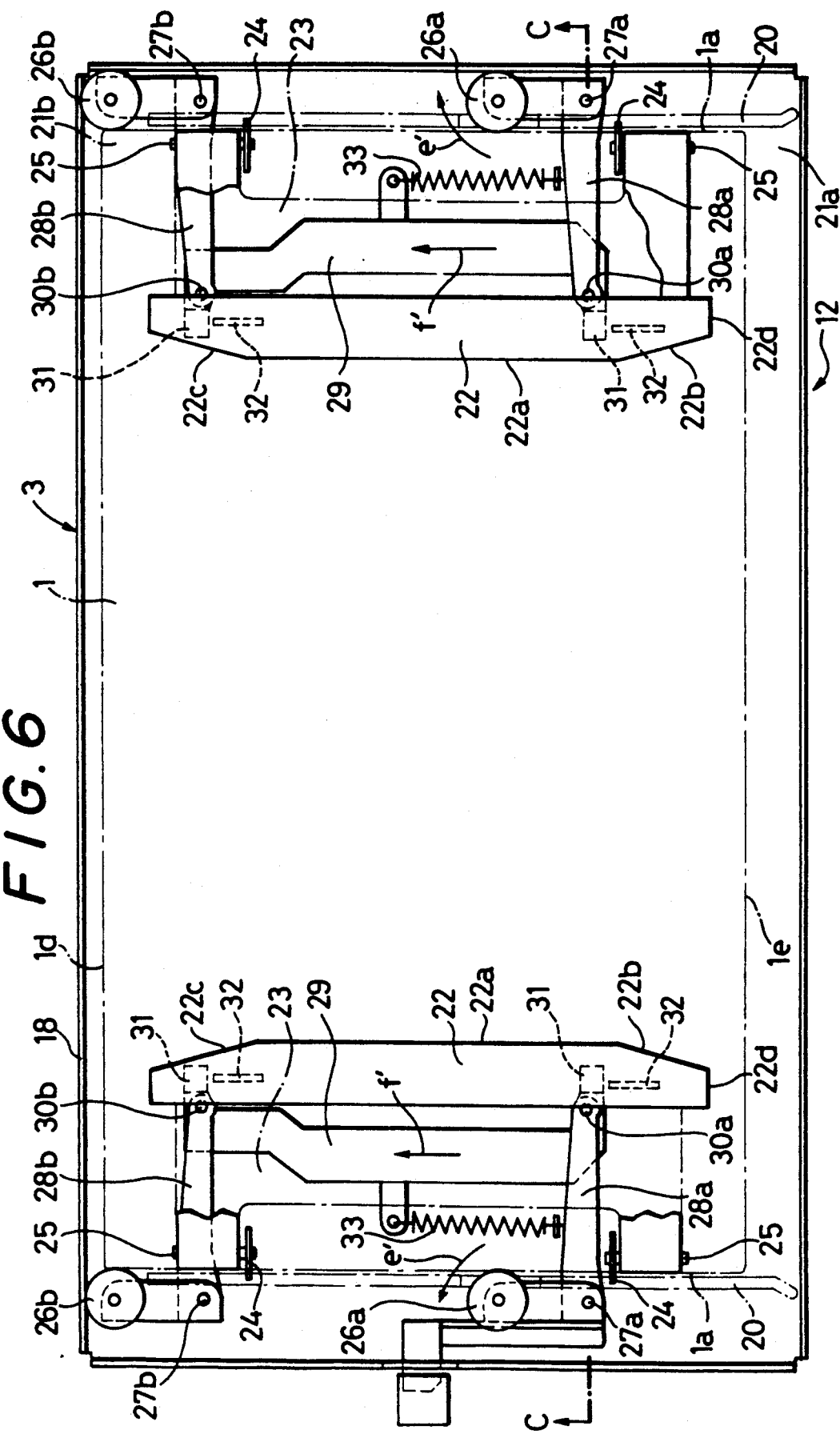
FIG. 6 is a plan view of the housing rack shown in FIG. 3, wherein a large cassette is accommodated.

At this time, as shown in FIG. 8, since both the small cassette guides 22 are positioned in the cassette-housing unit 21, the right and left sides 2a of the small cassette 2 are guided by the slanted surface 22b and guide surface 22a of both small cassette guides 22 and inserted precisely to the specified position in the cassette-housing unit 21. When the small cassette 2 is inserted into the cassette-housing unit 21 through the opening 21b from the above-described cassette transfer unit 10 in the g' direction, they are guided by the slanted surface 22c of both cassette guides 22 and guide surface 22a. Next the large cassette 1 is inserted into the cassette-housing 21 from the opening 21a on the above-described operator side 12 in the g direction. As shown in FIG. 5 and 9, when large cassette 1 is inserted into the cassette-housing 21 from the opening 21a side while being guided between the cassette guide plates 20 by a constant distance 1 in the g direction, (which is possible since a guide groove is provided as described later to prevent improper inserting of a cassette), the right and left side surfaces 1a are brought into contact with the pair of right and left detection rollers 26a. Then, as shown in FIG. 6, both detection rollers 26a are moved in the e' direction from the inside to the outside of the cassette-housing 21 against both return springs 33. (The external form of the large cassette 1 is detected by this.) At this time, both rotary arms 28a and 28b are rotated in the e' direction against both return springs 33 and both cam levers 29 are moved in the f' direction. Then the four cam driving units 31 are released from below the four cam follower units 32 in the f' direction. As shown in FIG. 10, both oscillating plates 23 rotate in the mark d' direction by their own weight, and both cassette guides 22 automatically retract from the inside of the cassette-housing unit 21 to the outside downwards.

Therefore, the small cassette guides 22 do not interfere with insertion of the large cassette 1. The large cassette 1 is guided between both large cassette guide plates 20, inserted correctly to the specified position in the cassette-housing unit 21.

Figure 7:
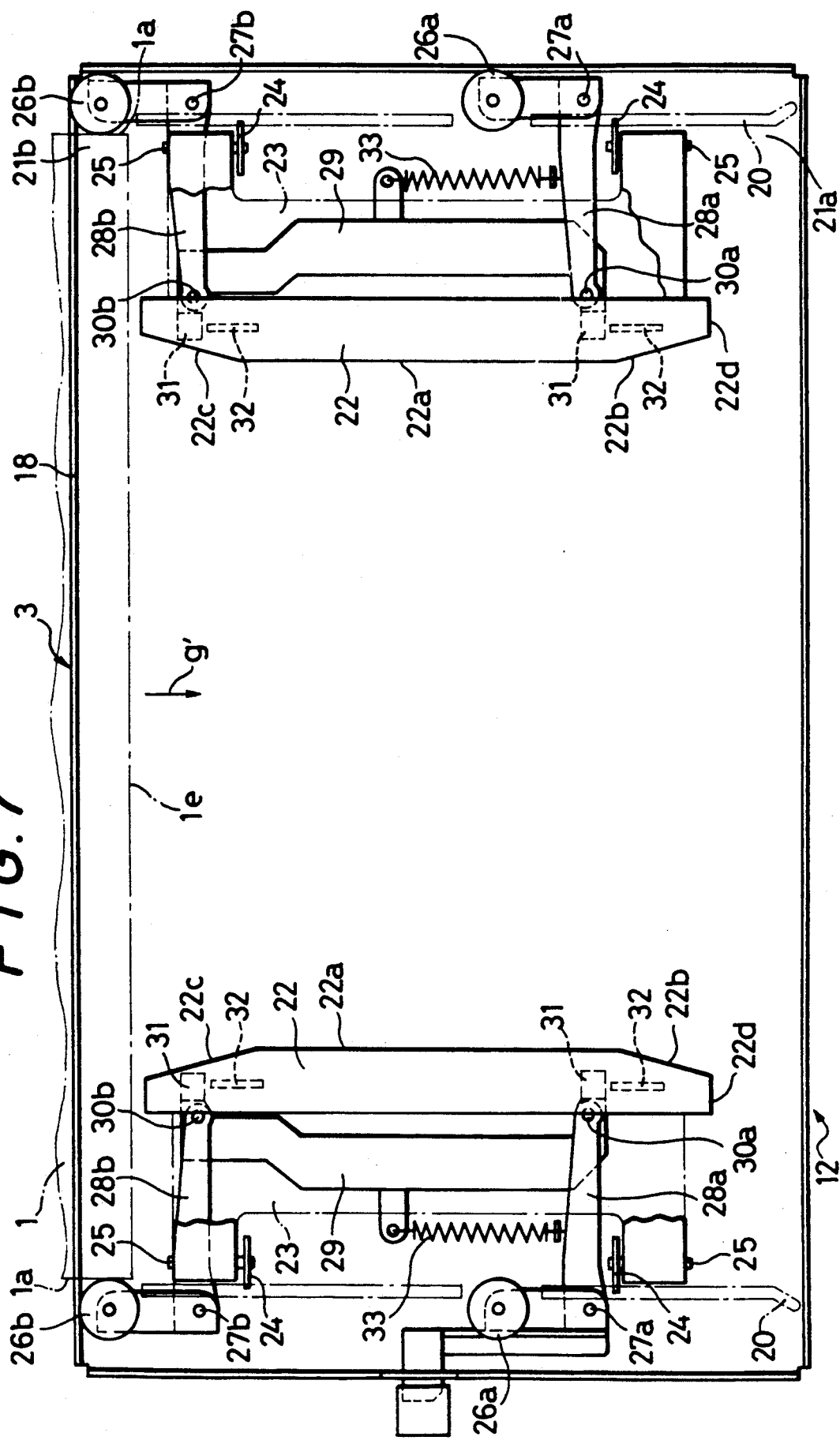
FIG. 7 is a plan view of the housing rack shown in FIG. 3, wherein a large cassette is going to be inserted.

As shown in FIG. 7, when the large cassette 1 is inserted into the cassette-housing unit 21 from the above-described cassette transfer unit 10 through the opening 21b in the g' direction, upon slight insertion of the large cassette 1 into the opening 21b, the external form of the large cassette 1 is detected by the pair of right and left detection rollers 26b on the opening 21b side. Both small cassette guides 22 retract automatically in the d' direction as shown in FIG. 10.

The means for preventing improper inserting of the large cassette 1 by both small cassette guides 22 is described below.

Figure 11:
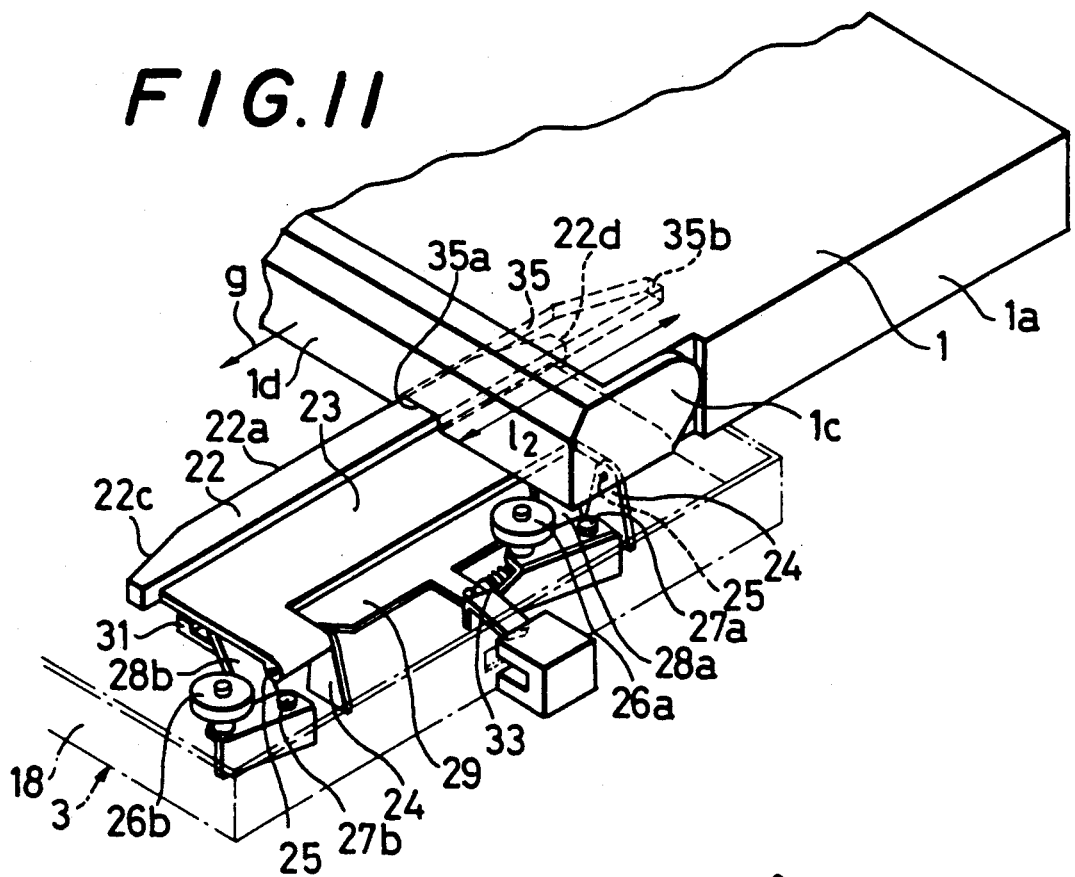
FIGS. 11 and 12 are fragmentary perspective views of the housing rack shown in FIG. 3, wherein a large cassette is going to be normally inserted.

As shown in FIGS. 9 and 11, a pair of right and left guide grooves 35 are provided in parallel with each other opposite the end 22d on the opening 21a side of both small cassette guides 22 on both the right and left sides of the bottom surface 1a of the large cassette 1. Both guide grooves 35 are slightly wider than both small cassette guides 22, so that the front cover 1c side of the large cassette 1 is composed at the open end 35a side and the opposite side is formed at the closed end 35b. The length 2 of both guide grooves 35 is slightly longer than the distance 1 shown in FIG. 5. FIG. 11 shows the large cassette 1 is correctly inserted into the cassette-housing unit 21 in the g mark direction. At the insertion starting time point (meaning the distance at which it is inserted by the distance 1 in FIG. 5 in the g direction), both guide grooves 35 have been inserted to both small cassette guides 22 from the open end 35a and both small cassette guides 22 guide the large cassette 1 through both guide grooves 35.

Figure 12:
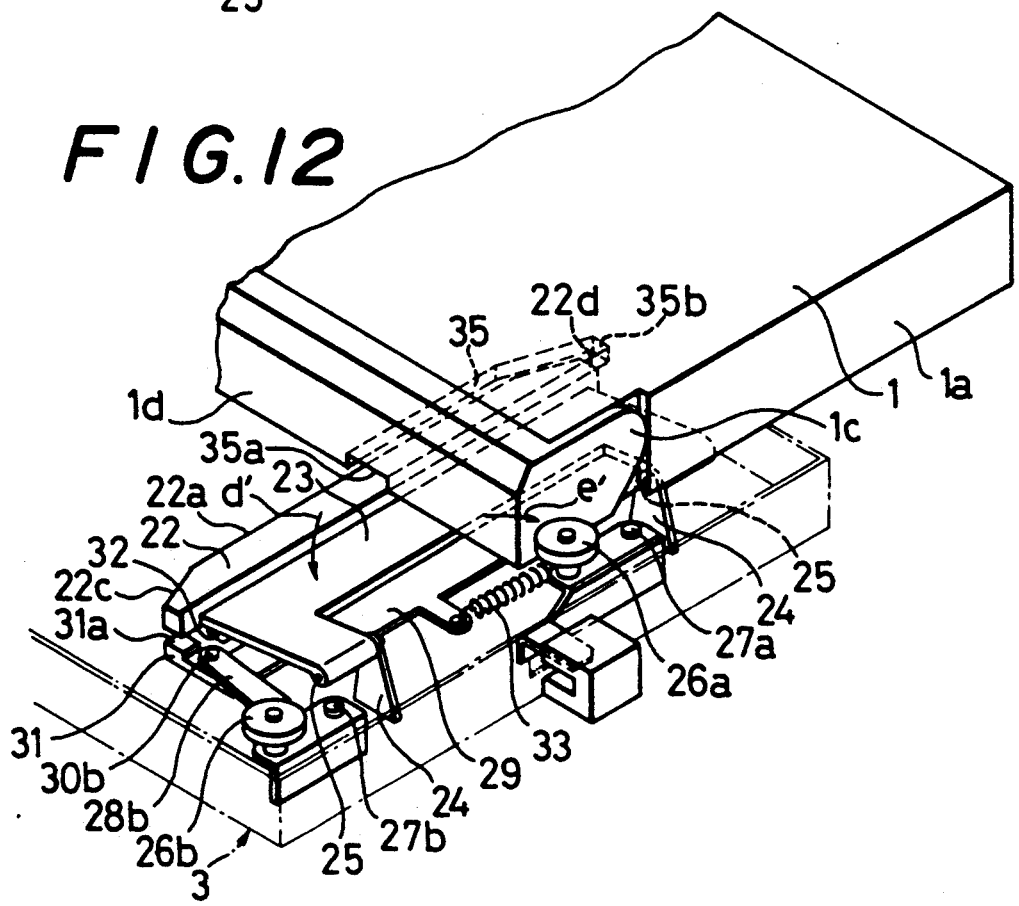
Figure 13:
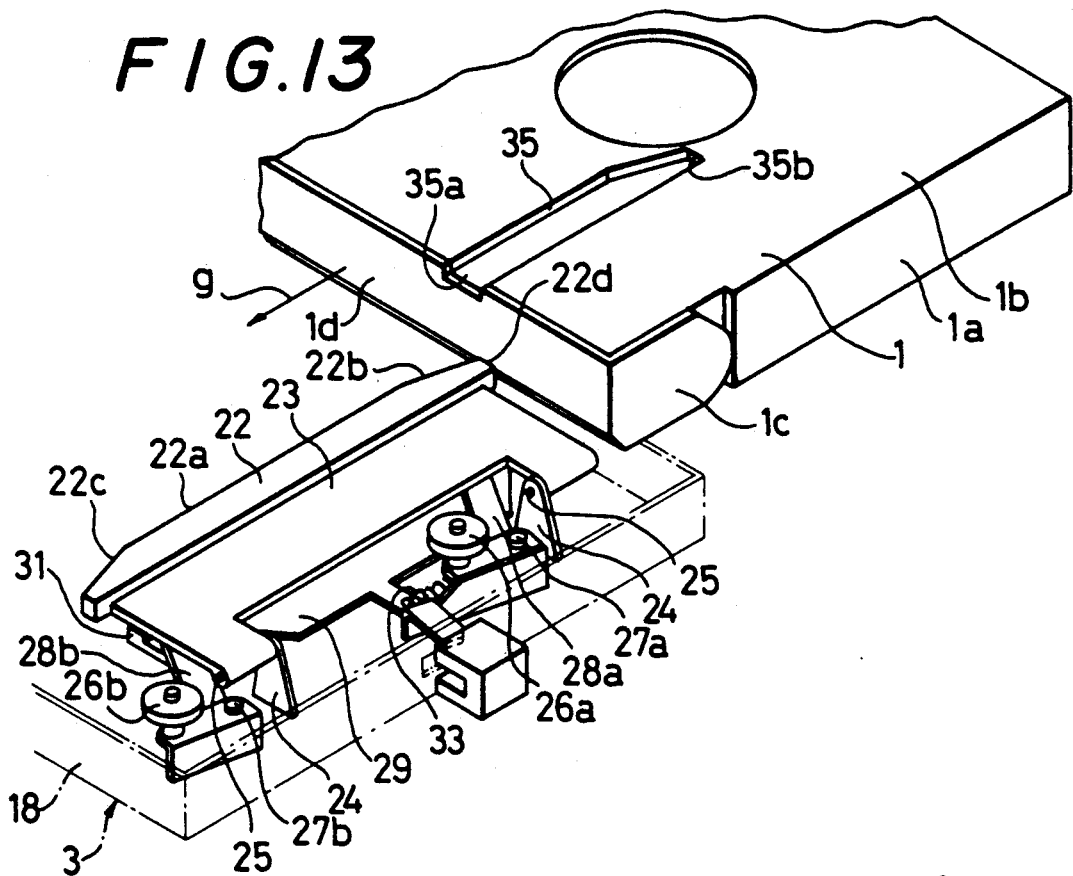
FIGS. 13 and 14 are fragmentary perspective views of the housing rack shown in FIG. 3, wherein a large cassette is going to be erroneously inserted.

As shown in FIG. 12, when the large cassette 1 is inserted more than the distance 1 as shown in FIG. 5 and the detection roller 26a is pushed in the e' direction on the side surface 1a of the large cassette 1, the small cassette guide 22 retracts from the inside of the guide groove 35 in the d' direction as described above. FIG. 13 shows the large cassette 1 inserted improperly in the g direction, that is upside down. At this time, the front surface 1d of the front cover 1c of the large cassette 1 touches the end 22d of both small cassette guides 22 to prevent the improper insertion of the large cassette in the g direction.

Figure 14:
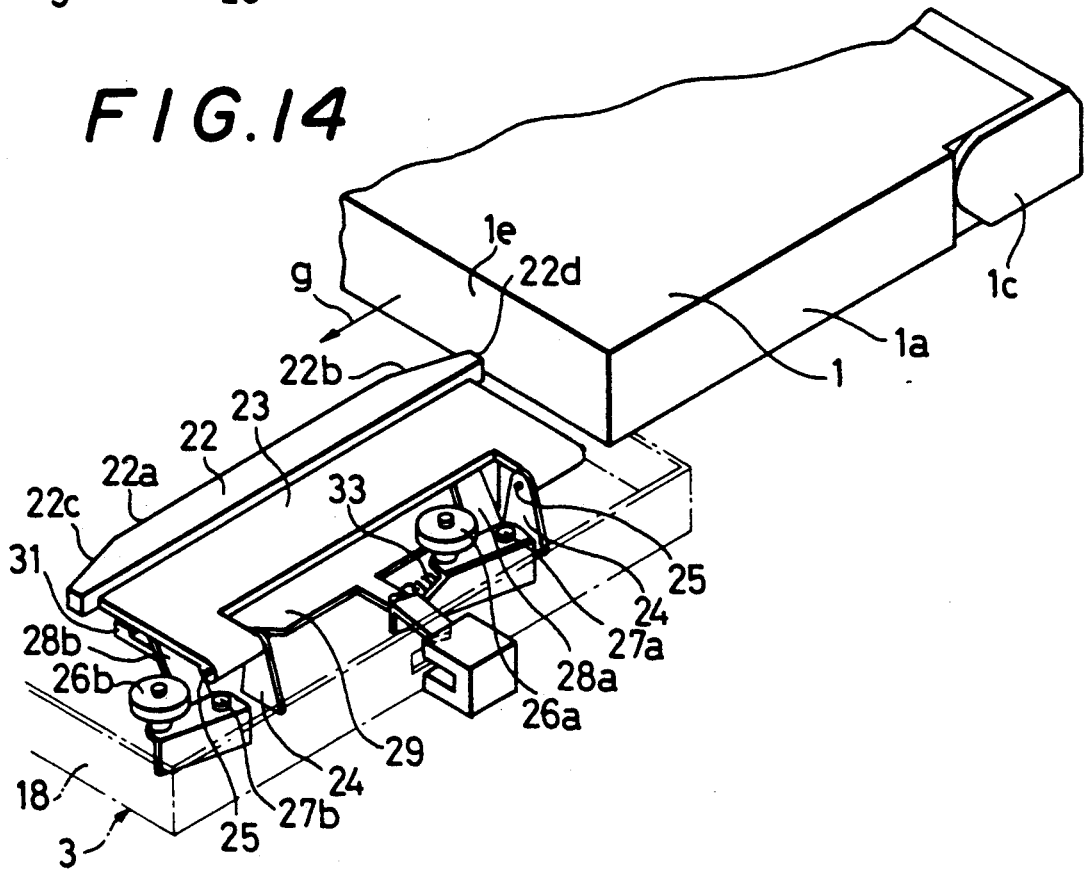
Figure 15:
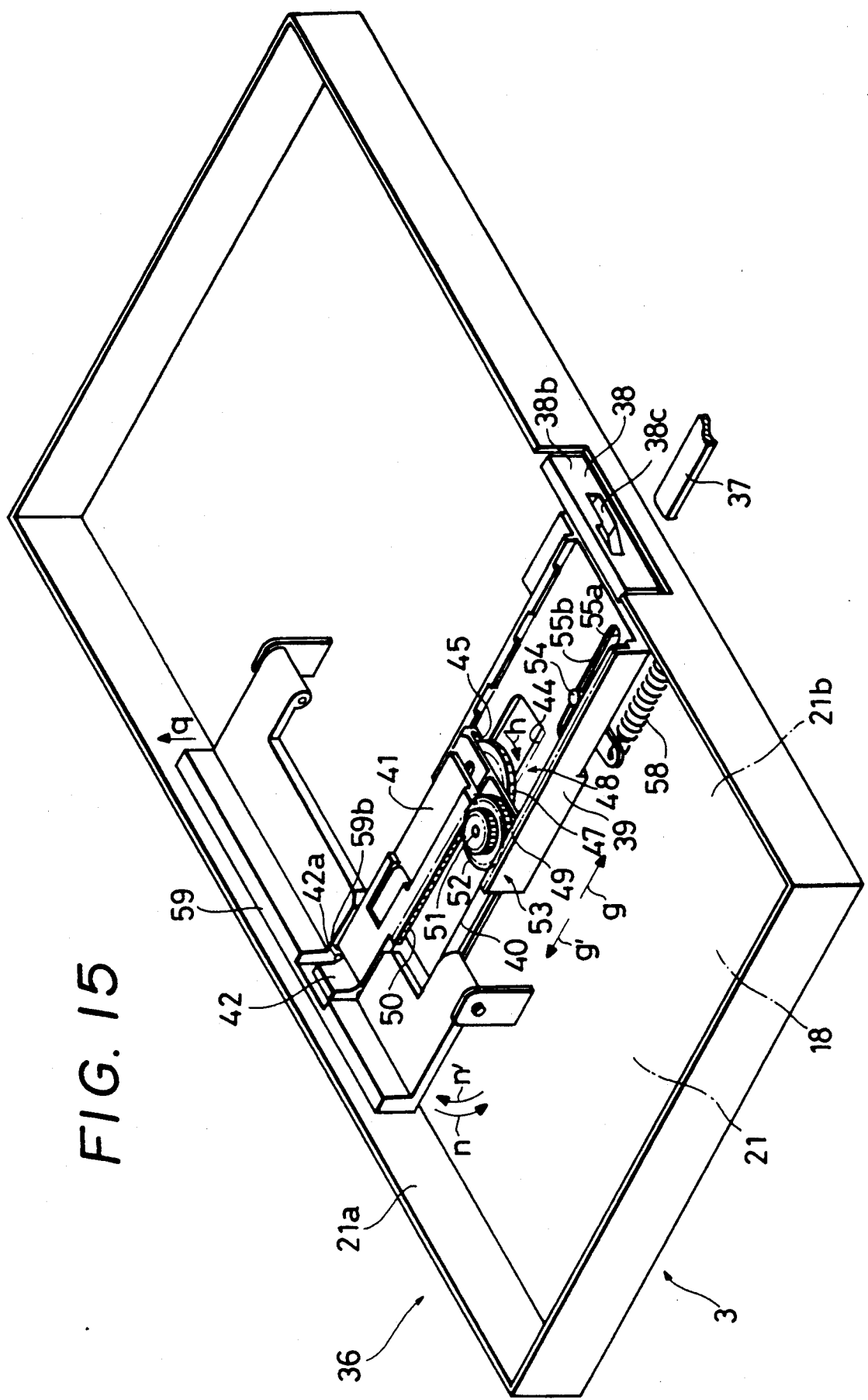
FIG. 15 is a perspective view of the cassette ejection means provided in the housing rack shown in FIG. 3.

FIG. 14 shows the large cassette is inserted with its front side in the g direction. The rear end 1e of the large cassette 1 touches the end 22d of both small cassette guides 22 to prevent improper insertion of the large cassette 1 in the g direction. As shown in FIG. 15, a cassette ejection means 36 is provided at the center of the rack chassis 18. When the push lever 37 provided for the cassette transfer unit 10 pushes the rack ejection member 38 of the cassette ejection means 36, the large cassette 1 or small cassette 2 held in the large and small cassette-housing rack 3 is ejected from the cassette transfer unit 10.

Figure 16:
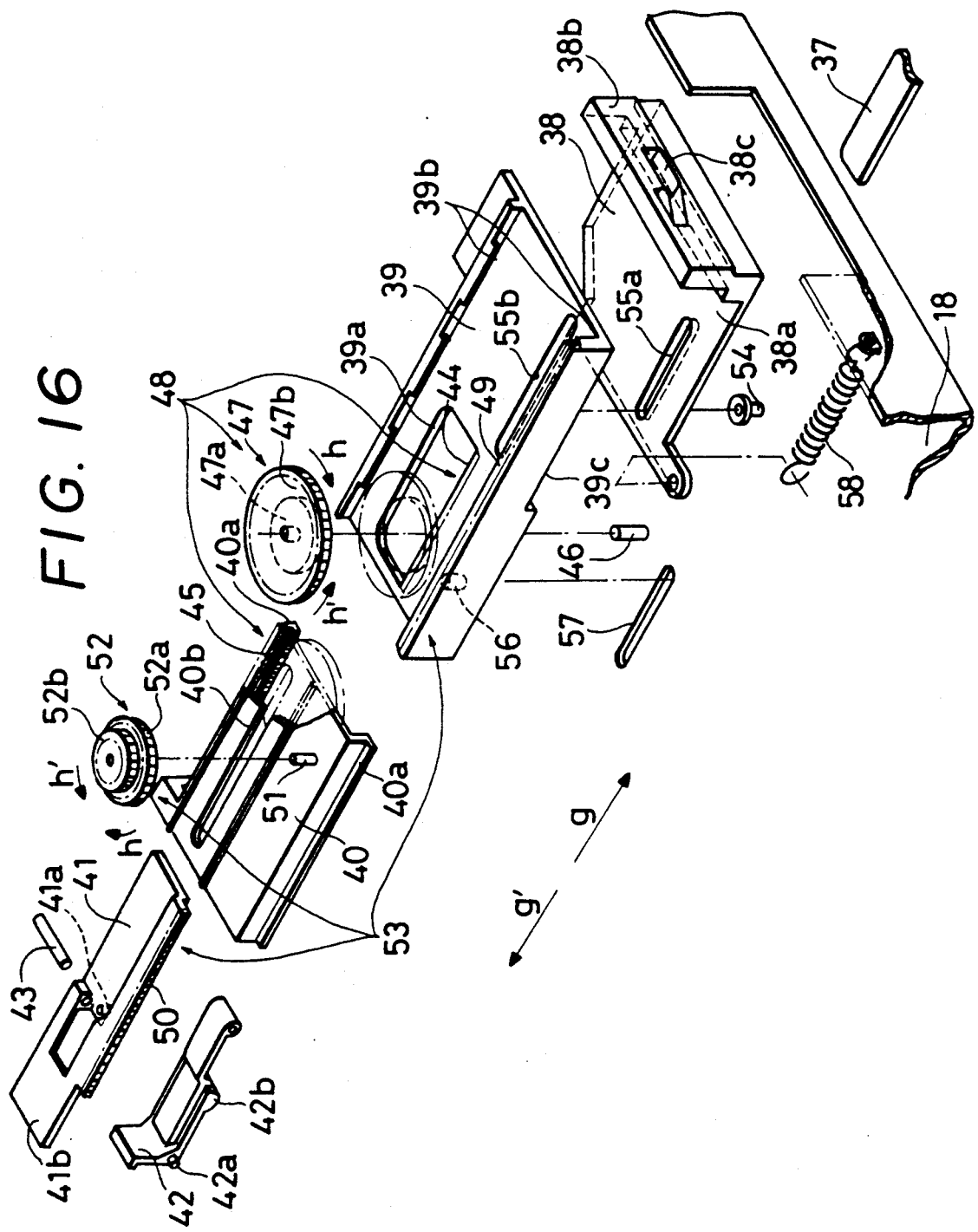
FIG. 16 is an exploded perspective view of the cassette ejection means shown in FIG. 15.

The cassette ejection means 36 is described below referring to FIGS. 15 and 16.

The cassette ejection means 36 comprises a rack ejecting member 38 which is moved from the returning position on the side of the opening 21b of the cassette-housing unit 21 to the forward position on the opening 21a side, first rack member 39 which is installed above the rack chassis 18 in the g and g' directions so as to freely move and is moved from the returning position on the opening 21b side of the cassette-housing unit 21 towards the forward position on the opening 21a side, second rack member 40 which is installed above the first rack member 39 in the g and g' directions so as to be moved freely, and the third rack member 41 for ejecting the cassette which is installed above the second rack member 40 in the g and g' direction so as to be moved freely and moved from the returning position on the opening 21a side of the cassette-housing unit 21 exactly opposite the first rack member 39 to the forward position on the opening 21b side. A nearly L-shaped cassette ejecting member 42 is installed so as to rotate freely in the n and n' directions through the horizontal fulcrum axis 43 above the third rack member 41. This cassette ejection means 36 is incorporated with the first rack and pinion mechanism 48 comprising the first and second racks 44 and 45 provided for the first rack member 39 and second rack member 40, and the first pinion 47 which is engaged between them and installed so as to rotate freely to the specified position above the rack chassis 18 through the vertical installing shaft 46, and the second rack and pinion mechanism 53 comprising the third and fourth racks 49 and 50 provided for the first rack member 39 and third rack member 41 and the second pinion 52 which is engaged between them and is installed to the above of the second rack member 40 so as to rotate freely about the installing shaft 51. The first pinion 47 comprises the lower small gear 47a and upper large gear 46b with the small gear 47a inserted into the rectangular opening 39a formed in the first rack 39 and engaged with the first rack 44 formed along one internal edge of the opening 39a. The section of the second rack member 40 is formed in "U" shape approximately, and a pair of guide rails 40a formed in parallel along both edges are fitted into the pair of guide grooves 39b formed in parallel along both upper edges of the first rack member 39. The large gear 47b of the first pinion 47 is engaged with the second rack 45 formed along the inside of the guide rail 40a on one side on the lower surface of the second rack member 40. The second pinion 52 comprises the lower large gear 52a and upper small gear 52b. The large gear 52a is engaged with the third rack 49 formed at a higher position than the rack member 40 along the side engaged on one side of the first rack member 39 and the small gear 52b is engaged with the fourth rack 50 formed along the side edge on one side of the third rack member 41. The guide pin 41a provided on the lower surface of the third rack member 41 is fitted to the guide groove 40b provided in the rack member 40. The cassette ejecting member 42 is positioned at the lower part of the lifting prevention plate 41b provided horizontally at the end of the third rack 41. This cassette ejecting member 42 is provided with a pair of guide pins 42a which are projected on the right and left sides and fitted with the guide groove 59b provided in the shutter 59 and the projection 42b provided on the lower surface. The shutter 59 turns in the arrow q direction when the cassette is housed completely in the cassette-housing unit 21 and causes the cassette ejecting member 42 to turn in the q direction around the fulcrum axis 43. The rack pushing member 38 is formed in a nearly L-shape by the horizontal plate 38a and vertical plate 38b. The horizontal plate 38a is inserted into the chassis 18 and the horizontal notch 39c provided on the lower surface of the first rack member 39 so as to be positioned above the rack chassis 18. The guide grooves 55a and 55b provided respectively in this horizontal plate 38a and first rack member 39 are fitted to the guide pin 54 installed above the rack chassis 18. The guide pin 56 provided on the lower surface of the first rack member 39 is fitted to the guide groove 57 provided in the rack chassis 18. There is a through hole 38C on the vertical plate 38b of the rack pushing member 38 into which the end of the third rack member 41 can be inserted. The rack pushing member 38 is forced towards the arrow g direction by the return spring installed between the rack chassis 18 and the rack pushing member 38. Now the operation of the cassette ejection means 36 is described below.

When the rack pushing member 38 is pushed in the g' direction by the pushing lever 37 provided in the cassette transfer 19, the first rack member 39 moves in the g' direction and the first pinion 47 is turned in the h direction. By the rotation of the first pinion 47 in the h direction, the second rack member 40 moves in the g direction and resultantly the second pinion 52 is turned in the h direction. By the rotation of the second pinion 52 in the h direction, the third rack member 41 and the cassette ejecting member 42 are moved in the g direction. The large cassette 1 or small cassette 2 housed on the rack board 19 is ejected towards the cassette transfer 10.

On the contrary, when the large cassette 1 or small cassette 2 is housed in the large and small cassette-housing rack 3 from the cassette transfer unit 10, the cassette is ejected to the large and small cassette-housing rack 3 by the cassette ejecting arm provided in the cassette transfer unit 10. At this time, the cassette ejecting member 42 and the third rack member 41 are moved in the g' direction by the cassette and the first rack member 39 is moved in the g direction by the action reverse to the above-described cassette ejection action.

In this way, cassettes are handed over between the large and small cassette-housing rack 3 and the cassette transfer unit 10.

As the large and small cassette-housing rack 3 according to this invention is composed as described above, large and small cassettes can be selectively housed in the same cassette-housing rack.

As the small cassette guide can be automatically retracted to the cassette-housing unit when the large cassette is inserted to the cassette-housing unit, the movement of the small cassette guides can be automatically controlled. Therefore, an operator does not need to retract the small cassette guide by hand every time when inserting a large cassette. Large and small cassettes can then be selectively inserted into the cassette-housing unit very easily and quickly.

Since the small cassette guide also serves to prevent improper insertion of a large cassette, a large cassette can always be inserted correctly into the cassette-housing unit.

Figure 17:
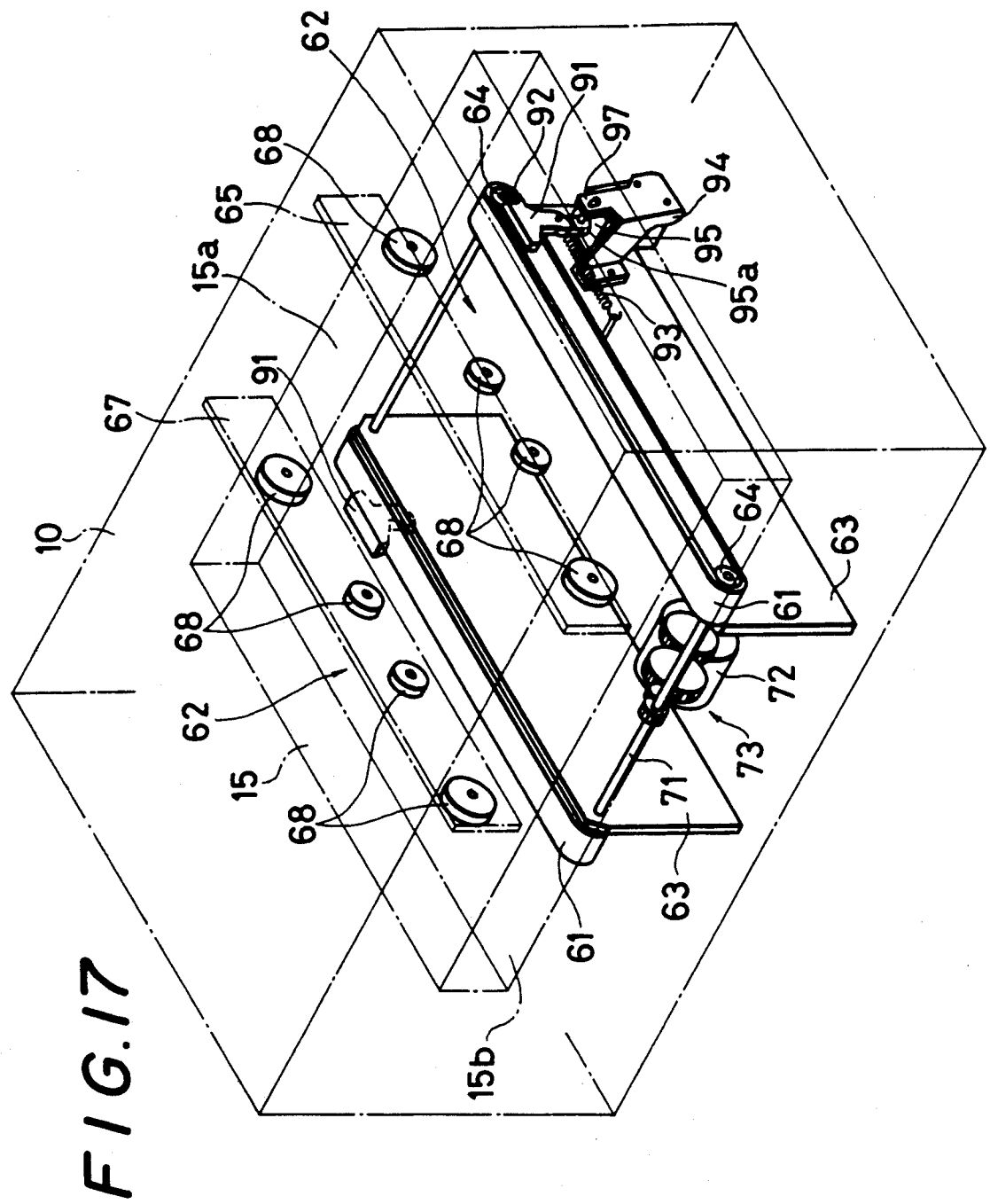
FIG. 17 is a schematic perspective view of a cassette transfer unit included in the automatic cassette changer according to this invention.

The composition of the cassette transfer unit 10 is described below referring to FIGS. 17 to 28. As shown in FIG. 17, the cassette transfer unit 10 is provided with a cassette-housing unit 15 horizontally, which is composed referring to the large cassette 1. Both ends 15a and 15b of the cassette-housing unit 15 in the longitudinal direction are open. A pair of right and left cassette transfer means comprising the transfer belt 61 and cassette ejection means 62 are provided respectively above and below the cassette-housing unit 15. The lower pair of right and left transfer belts are stretched between a pair of pulleys 64 installed to the pair of right and left vertical frames 63 so as to rotate freely.

As shown in FIG. 18, a multiple number of guide rollers 65 installed to the right and left frames 63 so as to rotate freely are arranged in the right and left transfer belt 61. The upper pair of right and left cassette ejection means 62 comprises four 4 push-up rollers 68 installed respectively to the pair of right and left frames 67, eight in total. As shown in FIG. 18, these multiple push-up rollers 68 are installed to the right and left frames 67 so as to move freely in the vertical direction through the roller arm 69 and forced downwards by the spring 70. A drive shaft 71 to drive the right and left transfer belts 61 at the same time are driven by the motor 72 installed to the frame 63 on one side as shown in FIG. 18 through the reduction gear mechanism 73.

As shown in FIG. 19, in the cassette-housing unit 15, there are pairs of right and left cassette guides 74 and large cassette guides 75, in total four, are provided and the large cassette guide 75 is fixed to the right and left horizontal frame 76 as shown in FIG. 20.

Figure 23:
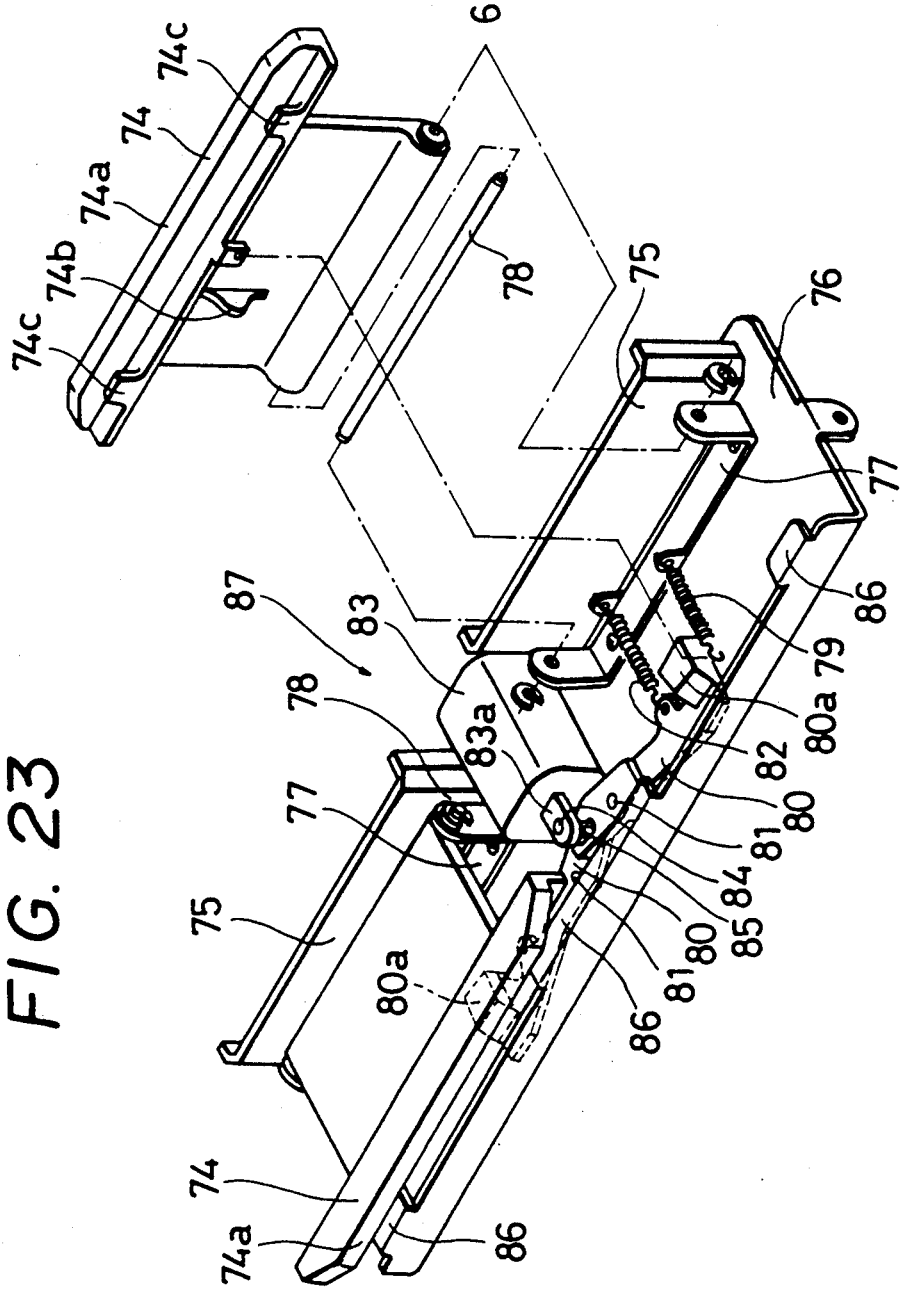
FIG. 23 is a perspective view of the main part of the cassette guide shown in FIG. 20.

The pair of right and left small cassette guides 74 are provided with guide surface 74a on the right and left opposing surfaces. These small cassette guides 74 are installed to the fulcrum axis 78 installed horizontally by the bracket 77 on the horizontal frame 76 as shown in FIG. 21 so as to rotate freely in the j and j' directions respectively and are forced to turn in the j' direction by the return spring 79. As shown in FIG. 20, a pair of right and left cam levers 80 are installed on the horizontal frame 76 by the vertical fulcrum axis 81 so as to rotate freely in the t and t' directions, respectively. As shown in FIG. 21, the cam 80a provided at one end of the pair of right and left cam levers 80 controls the projection 74b provided on the lower surface of the pair of right and left small cassette guides 74. As shown in FIGS. 20 and 23, a plunger solenoid 83 is installed in the middle between the pair of right and left small cassette guides 74 on the horizontal frame 76, and the plunger 83a is interconnected with the other end of the pair of right and left cam levers 81 through a pin 84 and long hole 85. This plunger solenoid 83 is controlled by the control unit 8 according to the information on the cassette size given by the operating program. As shown in FIG. 21, a pair of projections 74C provided on the lower surface on the guide surface 74a side of the pair of right and left small cassette guides 74 are inserted below the multiple number of floating-prevention stoppers 86 provided on the horizontal frame 76.

The guide driving mechanism 87 to move the small cassette guide 74 comprises a cam lever 80, plunger solenoid 83, return springs 79 and 82, and others. Positioning operation of the large and small cassettes 1 and 2 in the cassette-housing unit 15 of the cassette transfer unit 10 is described below.

As shown in FIG. 20, when receiving the large cassette 1 or small cassette 2 selectively from the enhousing racks 3 or 5, etc to the inside of the cassette-housing unit 15 in the k or k' direction, the large cassette or small cassette 2 selectively inserted from either the front or rear ends 15a or 15b into the cassette-housing unit 15 is placed on the cassette transfer belt 61, transferred on it, pulled into the position shown by the 1-dot or 2-dot line in FIG. 20 in the k or k' direction and housed.

At this time, when the large cassette 1 is received, the plunger solenoid 83 is controlled by the controller 8 so that the plunger 83a is moved in the extending direction. As shown in FIG. 22, a pair of right and left small cassette guides 74 are turned in the j' direction by the return spring 79 and retracted to the cassette-housing unit 15. Therefore, the large cassette 1 is guided by the pair of right and left large cassette guides 75 on both its right and left ends 1a, housed in the cassette-housing unit 15, and positioned at the position shown by 1-dot dash line in FIG. 20.

When the small cassette 2 is received, the plunger solenoid 83 is controlled by the controller 8, and as shown by the solid line in FIG. 20, power is supplied to both plunger solenoids 83, and the plunger 83a is retracted in the S direction. Then each pair of right and left cam levers 80 is turned in the arrow t direction against the return spring 82, the projection 74b of each pair of right and left small cassette guides 74 is pushed up by each pair of right and left cams 80a, each pair right and left small cassette guides 74 is turned in the j direction against the return spring 7 as shown in FIG. 21, and each pair of right and left small cassette guides 74 is inserted from below into the cassette-housing unit 15. The small cassette 2 inserted from the k and k' directions into the cassette-housing unit 15 is guided by the guide surface 74a of the pair of right and left small cassettes guide 74 at the right and left both ends 2a, housed into the cassette housing unit 15, and positioned at the position shown by the 2-dot-line in FIG. 20.

At this time, as shown in FIG. 21, the projection 4C of the small cassette guide 74 which was pushed upwards by the cam 80a is pushed from below by the stopper 86, and the position of the small cassette guide 74 is restricted to a horizontal position. The projection 74b of the small cassette guide 74 is completely dislocated on the cam 80a, the small cassette guide 74 does not escape downwards even though load is given from above to the small cassette guide 74 and is kept level. Therefore the problem that the small cassette 2 is dislocated on the small cassette guide 74 accidentally so that positioning becomes impossible does not occur at all.

Figure 24:
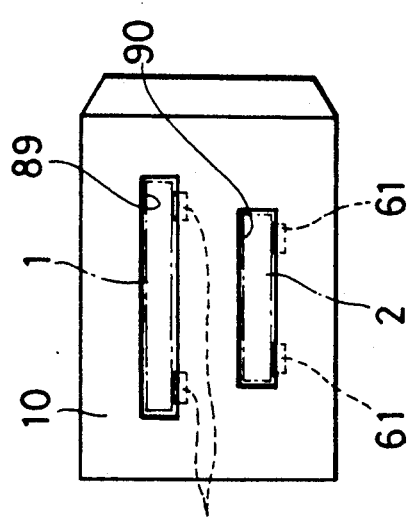
FIG. 24 is a front view of a cassette transfer unit in the automatic cassette changer according to another embodiment of this invention.

A modification is described referring to FIG. 24. In this modification, the cassette transfer 10 is provided with the housing unit 89 for the large cassettes only and the housing unit 90 for small cassettes use only in vertical positions so that the large cassette 1 and small cassette 2 are housed respectively in the housing units 89 and 90 for specific use and transferred.

Figure 25:
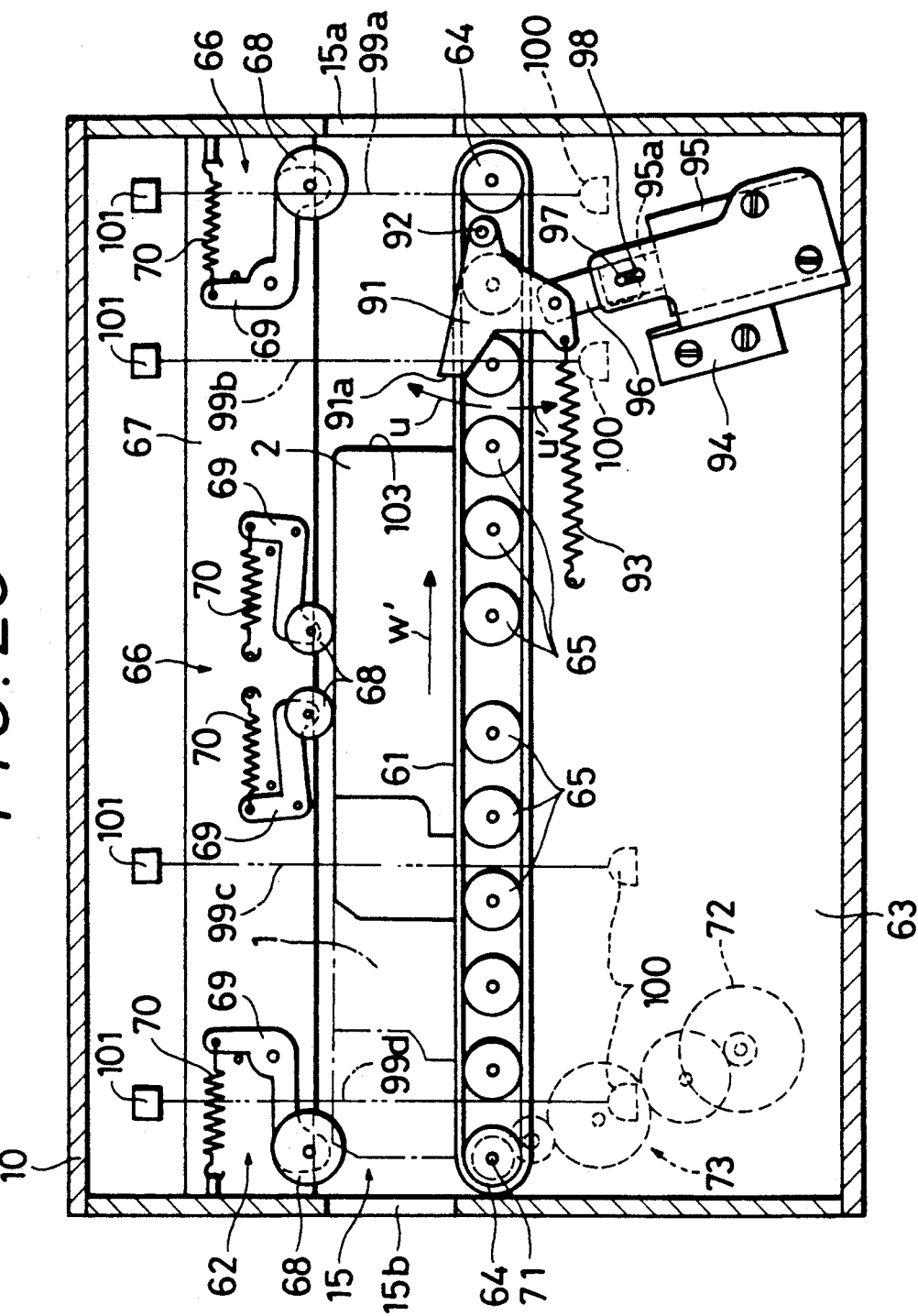
FIG. 25 is a side view of the cassette transfer unit shown in FIG. 17.
Figure 26:
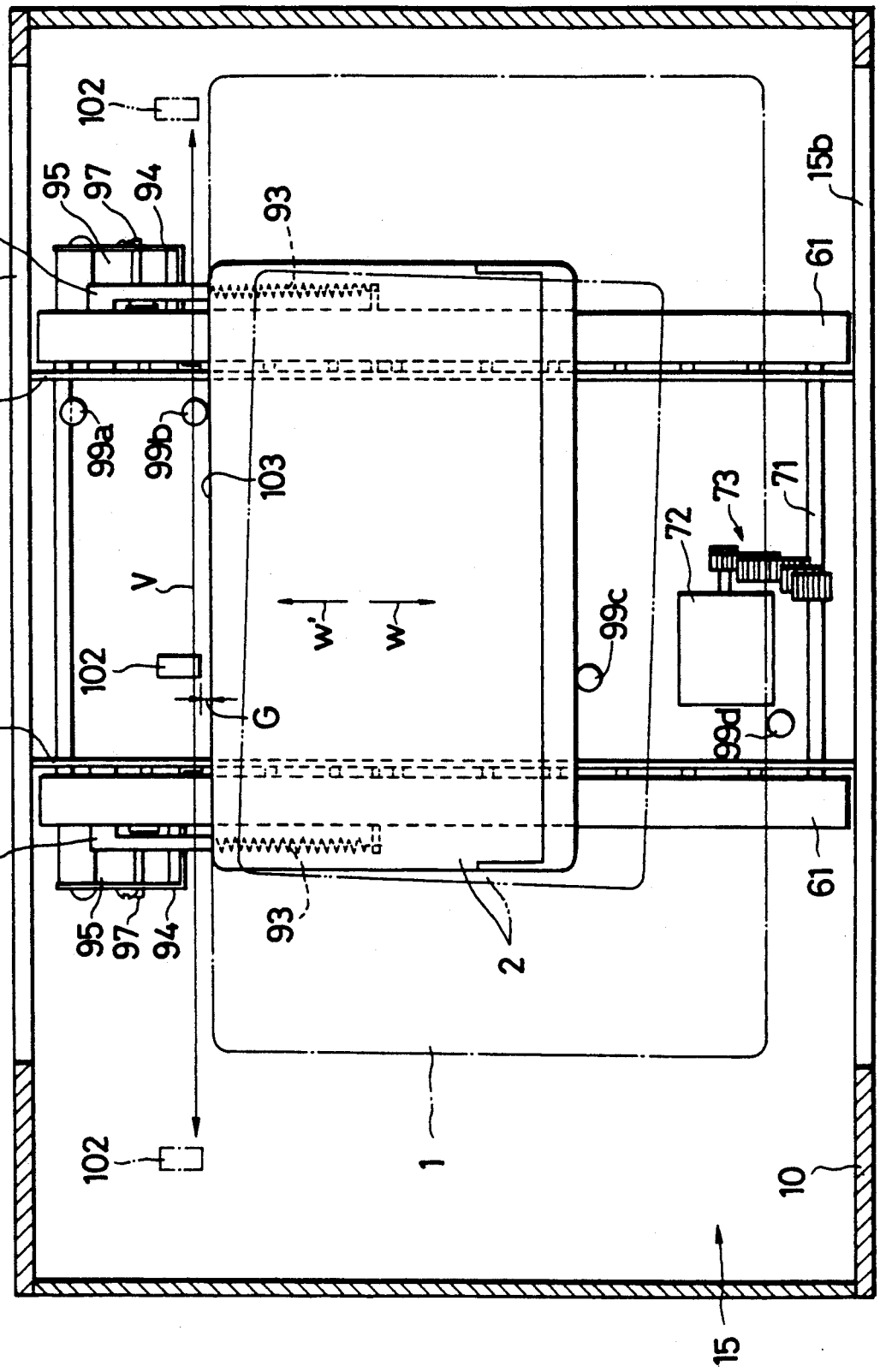
FIG. 26 is a front view of the cassette transfer unit shown in FIG. 17.

As described above, two types of cassettes of different sizes can be transferred by the cassette transfer unit according to this invention. Therefore such an application is also possible that short-term commercials or other programs are televised using a small cassette or news or other various long-term programs can be televised using the large cassette by one automatic cassette changer. It is very convenient when handling cassettes that length of televising time, etc. can be distinguished by the sizes of the cassettes. The mechanism to correct the cassette direction is described in detail referring to FIGS. 25 to 28. As shown in FIG. 25, a pair of right and left cassette stoppers having cassette receiving surface 91a, 91 are provided at the one-sided position 15a at the bottom in the cassette-housing unit 15. These cassette stoppers 91 are installed to the fulcrum pin 92 fixed horizontally to the pair of right and left frames 63 so as to rotate freely in the vertical u and u' directions and forced by the return spring 93 so as to rotate in the upward u direction. A pair of right and left plunger solenoids 95 are fixed to the pair of right and left frames 63 through the installing plate 94 and the plunger 95a is interconnected with the pair of right and left cassette stoppers 91 through the link 96. The pin 97 projected from the plunger 95a is fitted into the long hole 98 provided on the installing plate 94 and the vertical movement of the cassette stopper 91 is restricted by the restriction of the vertical movement range of the pin 97 by this long hole 98. As shown in FIG. 26, four sensors 99a, 99b, 99c and 99d are installed to detect the positions of the large and small cassettes 1 and 2 at four points, two near both ends 15a and 15b in the cassette-housing unit 15 and two on the inner side. These sensors 99a to 99d are photosensors comprising light emitting element 100 and light receiving element 101 respectively as shown in FIG. 25. As shown in FIG. 26, sensor 102 comprising a bar code reading reflection type photosensor is provided at one end 15a in the cassette-housing unit 15. This sensor 102 is guided by a horizontal running guide (not illustrated) perpendicular to the pair of right and left transfer belts 61 to run (reciprocate) between the returning position shown by one-dot dash line and returning position shown by 2-dot dash line. The operation to correct the direction of the large and small cassettes by the cassette direction correction mechanism is described below.

Figure 27:
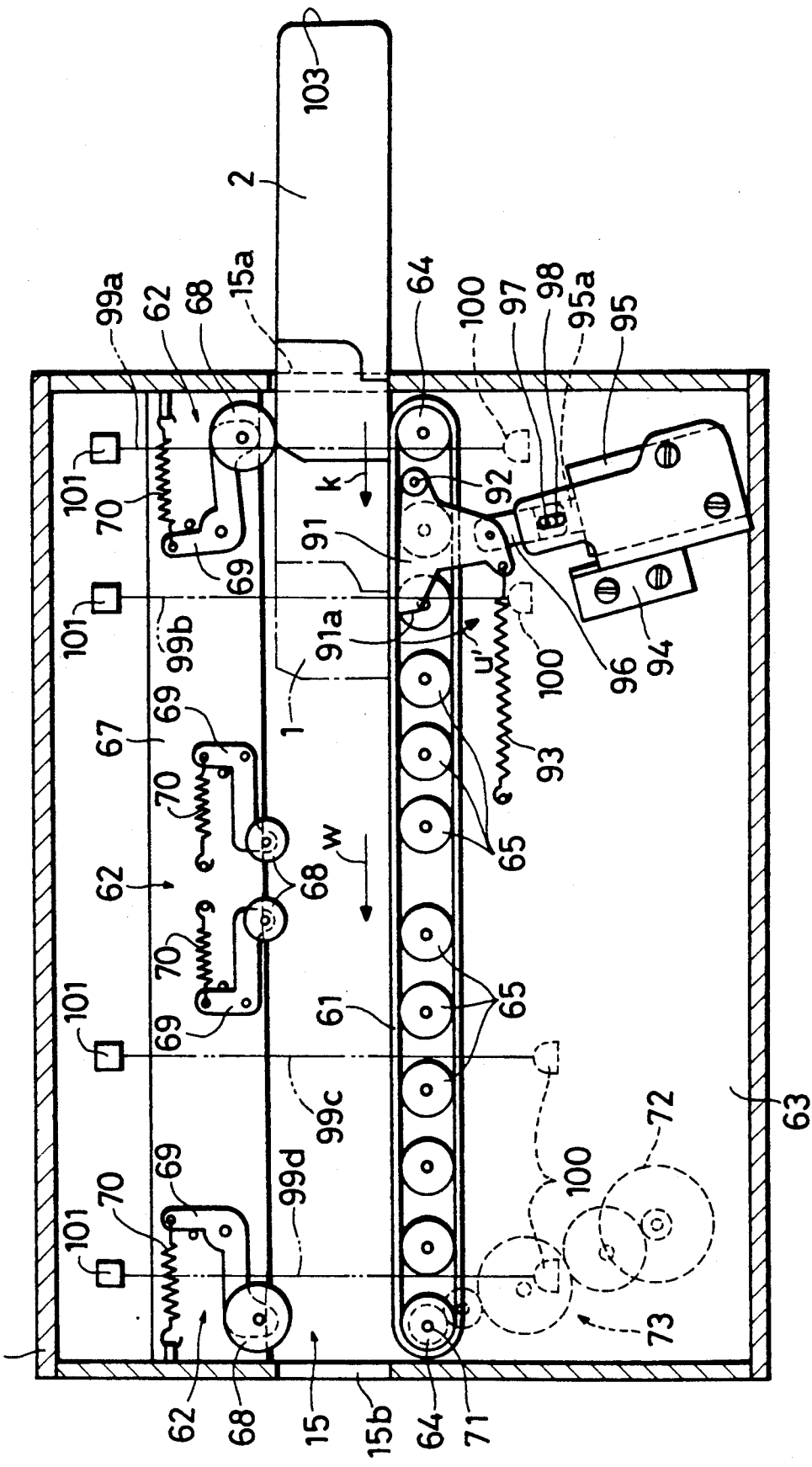
FIG. 27 is a side view of the cassette transfer unit shown in FIG. 17.

When the large and small cassettes 1 and 2 are selectively taken out from the large and small cassette-housing rack 3 into the cassette-housing unit 15 of the cassette transfer unit 10, at the initial stage, as shown in FIG. 27, the plunger solenoid 95 is locked due to the applied power supply, the plunger 95a is retracted downwards and locked, the pair of right and left cassette stoppers 91 have been turned in the u' direction against the return spring 93, and the cassette receiving surfaces 91a have been pulled down below the upper surface of the pair of right and left transfer belts 61.

As FIG. 27 shows, large and small cassettes 1 and 2 are selectively pulled into the cassette-housing unit 15 from one end 15a of the cassette-housing unit 15 and the pair of right and left transfer belts 61 have been driven in the w direction by the motor 72 by a speed reducer 73. The large and small cassettes 1 and 2 which were sent out of the housing racks 3 and 5 in the k direction are inserted in one end 15a of the cassette-housing unit 15, interposed from above and below by the pair of right and left transfer belts 61 and multiple number of push-up rollers 68, by the force of the spring 70, and pulled in via the w direction. The sensors 99a and 99b detect the large and small cassettes 1 and 2 in succession.

As shown in FIG. 25, when the large cassette 1 is pulled into the position shown by the 1-dot dash line and the sensor 99d detects the large cassette 1, or when the small cassette 2 is pulled into the position shown by the solid line and the sensor 99c detects the small cassette 2, power supply to the plunger solenoid 95 is cut off so that locked plunger solenoid 95 is released, the locked plunger 95a is released, the pair of right and left cassette stoppers 91 are turned in the u direction by the return spring 93, and the cassette receiving surface 91a is moved upwards higher than the top surface of the pair of right and left transfer belts 61. At this time, the cassette receiving surface 91a of the stopper 91 becomes vertical.

At the same time, the motor is reversely driven, the pair of right and left transfer belts 61 are driven in the w' direction, and the large and small cassettes 1 and 2 are transferred reversely in the w' direction. As shown in FIGS. 18 and 26, the side 103 of the large and small cassettes 1 and 2 which were transferred reversely in the w' direction come into contact with the vertical cassette receiving surface 91a of the pair of right and left cassette stoppers 91 and is stopped. As a result, the inclination of the cassettes as shown by the 2-dot dash line in FIG. 26, for instance, is corrected and the large and small cassettes 1 and 2 are positioned correctly.

As shown in FIGS. 18 and 26, when the positioning of the large and small cassettes 1 and 2 between the sensor 99b and 99c is detected by these sensors, the motor 72 is stopped. Then the bar code reading sensor 102 runs in the direction between the returning position shown by 1-dot dash line and the forward position shown by the 2-dot dash line in FIG. 26. The sensor 102 at this time can move at a constant distance G to the side 103 of the large and small cassettes 1 and 2 along the side 103 in complete parallel with it so that the sensor 103 can read the bar codes (not illustrated) provided on the side 103 correctly.

Upon completion of bar code reading by the sensor 103, power is supplied to lock the plunger solenoid 95, the plunger 95a is retracted downwards and locked, the pair of right and left cassette stoppers 91 is turned in the u' direction against the return spring 93 as shown in FIG. 27, and their cassette receiving surface 91a is moved again below the top surface of the pair of right and left transfer belts 61.

Figure 28:
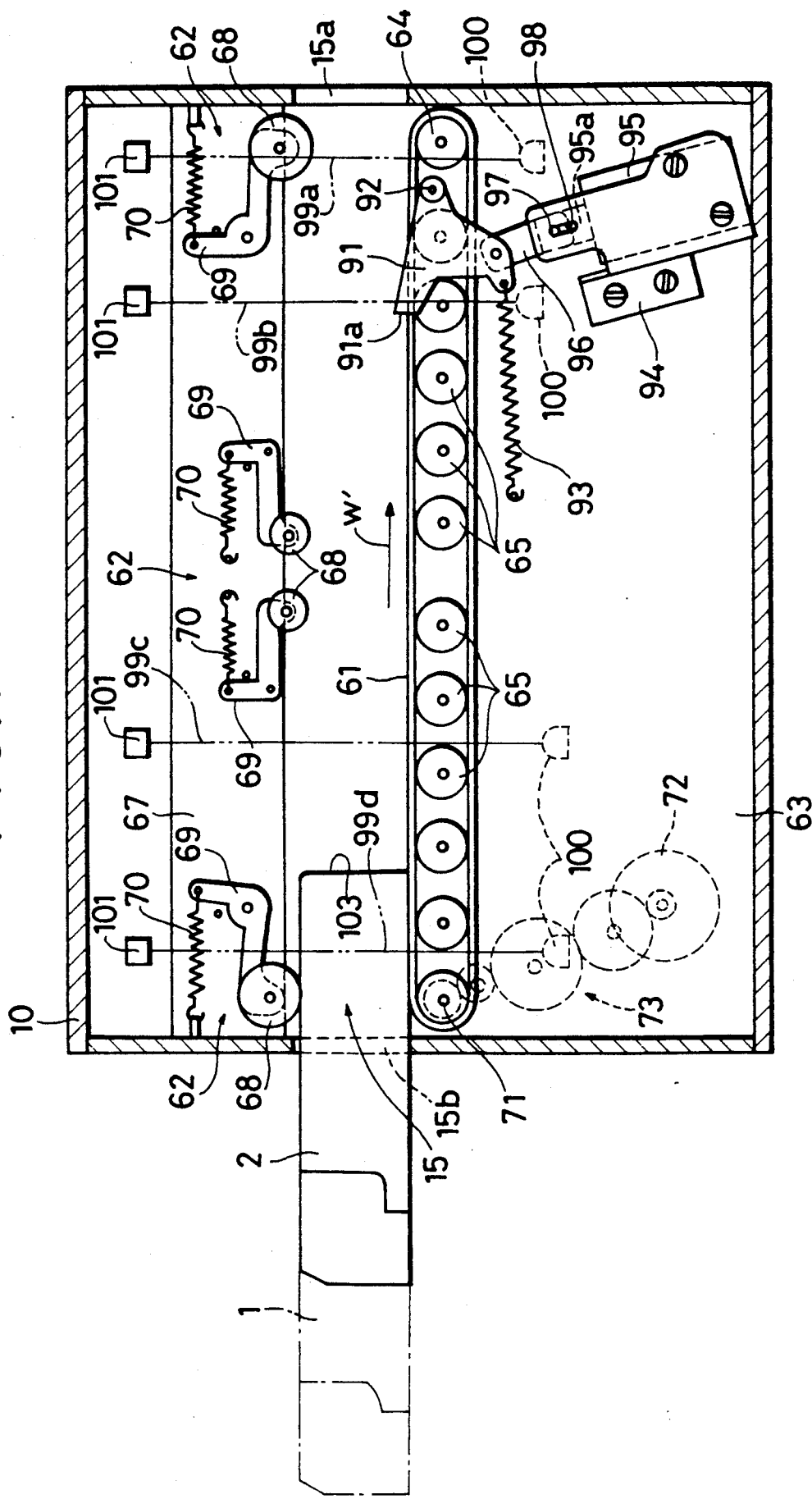
FIG. 28 is a side view of the cassette transfer unit shown in FIG. 17.

FIG. 28 shows that the large and small cassettes 1 and 2 are selectively pulled into the cassette-housing unit 15 from the other end 15b of the cassette-housing unit 15, and in this case, the pair of right and left cassette transfer belts 61 are driven in the w' direction by the motor 72 When the sensor 99d detects the large and small cassettes 1 and 2, the cassette receiving surface 91a of the pair of right and left cassette stoppers 91 is moved above the top surface of the pair of right and left transfer belts 61 by the same action as described above, side surface 103 of the large and small cassettes 1 and 2 which were pulled in the w' direction by the pair of right and left transfer belts 61 touches the cassette receiving surface 91a of the pair of right and left cassette stoppers 91 as shown in FIG. 18 and is stopped, so that the inclination of the large and small cassettes 1 and 2 is corrected as described before. In this embodiment, the pairs of right and left cassette transfer means and cassette stoppers are respectively provided. When the width of the cassette transfer means and cassette stoppers in the lateral direction to the width of the cassettes in the lateral direction is sufficiently large, respectively one cassette transfer means and cassette stopper is enough.

The cassette transfer device according to this invention is composed as described above and the inclination of a cassette which is ejected in the cassette-housing unit of the cassette transfer means from the cassette-housing can be corrected easily. Therefore, when bar codes provided on the side surface of the cassette are read by a sensor reciprocating in the cassette-housing unit, the sensor can be moved at a constant interval from the cassette side surface, along and in parallel to the cassette side surface so that bar codes can be read correctly using a sensor having a narrow depth of focus. Also when sending out a cassette to the recording/playback unit or cassette-housing rack from the cassette-housing unit on the cassette transfer unit, it can be sent out easily and smoothly without inclination. In addition, only a cassette stopper is added making use of the cassette transfer means which is usually provided for the cassette transfer unit and resultantly the structure is simple.

Various embodiments of this invention have been described so far, and various other effective modifications are possible based on the technical concept of the invention, which is limited only by the appended claims.

1. Large cassette
2. Small cassette
3. Large and small cassette-housing rack
4. Rack block
5. Rack for small cassette use
6. Rack block
8. Control unit
9. Rack block
10. Cassette transfer
11. Transfer route
12. Operator's side (front side)
13. Recording/reproducing unit
14. Cassette loading/discharging adaptor
15. Cassette-housing unit
16. Opening/closing door
18. Rack chassis
19. Rack stay 20. Large cassette guide plate
21. Cassette-housing unit (space)
22. Small cassette guide
23. Oscillating plate
24. Bracket
25. Fulcrum axis
29. Cam lever
31. Cam drive shaft
32. Cam follower
33. Return spring
35. Guide groove
36. Cassette push-out means
37. Pushing lever
38. Rack pushing member
39. First rack member
40. Second rack member
41. Third rack member
42. Cassette push-out member
43. Fulcrum axis
44. First rack
45. Second rack
46. Installing shaft
47. First pinion
48. First rack & pinion mechanism
49. Third rack
50. Fourth rack
51. Installing shaft
52. Second pinion
53. Second rack & pinion mechanism
54. Guide pin
56. Guide pin
57. Guide groove
58. Return spring
59. Shutter
61. Transfer belt
62. Cassette push-up means
63. Vertical frame
64. Pulley
65. Guide roller
67. Frame
68. Push-up roller
69. Roller arm
70. Spring
71. Driving shaft
72. Motor
73. Reduction gear mechanism
74. Small cassette guide
75. Large cassette guide
76. Frame
77. Bracket
78. Fulcrum axis
79. Return spring
80. Cam lever
81. Fulcrum axis
82. Return spring
83. Plunger solenoid
84. Pin
85. Long hole
86. Stopper
87. Guide driving mechanism
89. Housing unit for large cassette use
90. Housing unit for small cassette use
91. Installing stay
95. Plunger solenoid
96. Link
97. Pin
98. Long hole
100. Light emitting element
101. Light receiving element
102. Sensor
103. Side surface
7a. Rack for insertion use
7b. Rack for discharge use
12a. Rack block row
12b. Rack block row
13a. Cassette inlet
21a. Opening
21b. Opening
22a. Guide surface
22b. Inclined surface
22c. Inclined surface
26a. Detection roller
26b. Detection roller
27a. Fulcrum axis
27b. Fulcrum axis
28a. Rotary arm
28b. Rotary arm
30a. Pin
30b. Pin
31a. Upper end surface
32a. Lower end surface
32b. Tapered surface
2a. Right and end sides
1a. Right and left side surface
1b. Bottom surface
22d. End
1c. Front cover
35a. Opened end
35b. Closed end
1d. Front surface
1e. Rear and surface
47a. Small gear
47b. Large gear
39a. Opening
40a. Guide rail
39b. Guide groove
52. Large gear
52b. Small gear
41a. Guide pin
40b. Guide groove
41b. Lifting prevention plate
59b. Guide groove
42a. Guide pin
42b. Projection
38a. Horizontal plate
38b. Vertical plate
39c. Notch
55a. Guide groove
55b. Guide groove
38c. Through hole
15a. Front end
15b. Rear end
74a. Guide surface
80a. Cam
74b. Projection
83a. Plunger
74c. Projection
91a. Cassette receiving surface
95a. Plunger
99a. Sensor
99b. Sensor
99c. Sensor
99d. Sensor Arrow mark
1. Constant distance
2. Length
3. Interval

What is claimed is:

1. An automatic cassette changer for selectively loading cassettes of various sizes into a recording and/or playback unit, said cassette changer comprising:

cassette-housing racks having first cassette rack guides for guiding to a storage position a first cassette of a first size that has at least two, parallel, opposite sides and second cassette rack guides for guiding to a storage position a second cassette of a second size that has at least two, parallel, opposite sides, said second size being different than said fist size;

a cassette transfer unit having means for selectively drawing said first cassette of the first size or said second cassette of the second size from said cassette-housing racks or said recording and/or playback unit and having first cassette transfer unit guides for guiding said two sides of said first cassette of the first size, and having second cassette transfer unit guides for guiding said two sides of said second cassettes of the second size, so as to transfer said first cassette of the first size or said second cassette of the second size drawn from said cassette-housing racks to said recording and/or playback unit, and vice versa; and a control unit for controlling motions of said cassette transfer unit to transfer first cassettes of the first size and second cassettes of the second size between said cassette housing racks and the recording/playback unit in accordance with information supplied under a predetermined operating program.

2. An automatic cassette changer according to claim 1, wherein said cassette-housing racks have detection means for detecting the external form of said first cassette of the first size, and control means interlocked with said detection means for causing said second cassette rack guides to oscillate and vacate the storage position to receive said first cassette in the respective storage position.

3. An automatic cassette changer according to claim 1, wherein said cassette transfer unit comprises a cassette housing and solenoid operated plungers for causing said second cassette transfer unit guides to oscillate and vacate an inside of the cassette housing for receiving therein said first cassette.

4. An automatic cassette changer according to claim 3, wherein said solenoid operated plungers are controlled by said control unit with information supplied under said predetermined operating program based on the size of the first or second cassette inserted into said cassette housing of the cassette transfer unit.

5. Cassette-housing racks for selectively storing cassettes of a first size and cassettes of a second size, a cassette of said first size differing from a cassette of said first size, each of said cassettes having at least two, parallel, opposite sides and said cassette-housing racks comprising:

a housing for selectively holding a cassette of the first size or a cassette of the second size;

first guides within said housing for guiding the two, parallel, opposite sides of said cassette of the first size so as to receive said cassette of the first size in a predetermined position within said housing;

second guides movably arranged within said housing and being operable in a first position for guiding the two, parallel, opposite sides of said cassette of the second size so as to receive said cassette of the second size in a predetermined position within said housing;

detection means for detecting the external form of said cassette of the first size; and control means interlocked with said detection means so as to move said second guides toward a second position inoperable for guiding a cassette of the second size, as said cassette of the first size is inserted into said housing.

6. A cassette transfer unit for transferring cassettes of a first size and cassettes of a second size different than the first size and each having at least two, parallel, opposite sides from cassette-housing racks to a recording and/or playback unit, and vice versa, said cassette transfer unit comprising:

a cassette-housing unit;

means for moving a cassette of a first size or a cassette of a second size from said cassette-housing racks into said recording and/or playback unit, and vice versa;

first guides within said cassette-housing unit for guiding the two, parallel, opposite sides of said cassette of the first size;

second guides movably arranged within said cassette-housing unit and being operable in a first position for guiding the two, parallel, opposite sides of said cassette of the second size; and drive means for moving said second guides from said first operable position inside the cassette-housing unit of said cassette transfer unit to a second inoperable position outside of said cassettehousing unit, and vice versa.

7. A cassette transfer unit according to claim 6, wherein said means for moving a cassette of the first size or said cassette of the second size comprises a pair of transfer belts.

8. A cassette transfer unit for transferring cassettes from cassette-housing racks to a recording and/or playback unit, and vice versa, said cassette transfer unit comprising:

a cassette-housing unit;

conveyance means including transfer belts for conveying a cassette drawn from said cassette-housing racks or said recording and/or playback unit to aid cassette-housing unit;

guide rails movable between a first, operable position inside said cassette-housing unit and a second, inoperable position outside of said cassette-housing unit; and drive means for moving said guide rails to said first position inside of said cassette-housing unit when said cassette drawn from said cassette-housing racks or said recording and/or playback unit is conveyed to said cassette-housing unit by said conveyance means, said cassette having a direction of movement with respect to said transfer belts that is corrected by abutment of said guide rails against said cassette.

9. A cassette transfer according to claim 8 wherein said pair of transfer belts have a given travel direction, further comprising a sensor movable perpendicularly to the travel direction of said pair of transfer belts to read a bar code applied to said cassette.

* * * * *

UNITED STATES PATENT AND TRADEMARK OFFICE
CERTIFICATE OF CORRECTION

PATENT NO. : 5,016,127
DATED : May 14, 1991
INVENTOR(S) : Yasuo Inoue, Haruo Takeda, Keiji Sato, Noriyuki Yamazaki, Osamu Iida It is certified that error appears in the above-identified patent and that said Letters Patent is hereby corrected as shown below:

```
Col. 1, line 57, change "a" second occurrence to --an--
Col. 2, line 60, after "racks" delete "...-"
Col. 4, line 57, after "are" delete ","
Col. 9, line 33, change "etc" to --etc.--
Col. 10, line 3, change "4C" to --74c--
Col. 11, line 14, after "15" insert --,--
        line 54, change "sensor" to --sensors--
        line 56, after "the" first occurrence, insert
        --v--
```

In the Claims:

```
Col. 15, line 11, change "fist"  to --first--
Col. 16, line 33, change "cassettehousing" to
        --cassette-housing--
        line 46, change "aid" to --said--
```

Signed and Sealed this

Twenty-fourth Day of November, 1992

Attest:

DOUGLAS B. COMER

Attesting Officer    Acting Commissioner of Patents and Trademarks